(12) United States Patent
Kogushi et al.

(10) Patent No.: US 10,252,384 B2
(45) Date of Patent: Apr. 9, 2019

(54) AUTOMATED ASSEMBLY APPARATUS AND AUTOMATED ASSEMBLY METHOD

(71) Applicant: CANON KABUSHIKI KAISHA, Tokyo (JP)

(72) Inventors: Wataru Kogushi, Yokohama (JP); Shinsuke Iizuka, Kawasaki (JP); Yosuke Nakano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 551 days.

(21) Appl. No.: 14/867,235

(22) Filed: Sep. 28, 2015

(65) Prior Publication Data
US 2016/0089755 A1 Mar. 31, 2016

(30) Foreign Application Priority Data

Sep. 30, 2014 (JP) ................. 2014-199886
Apr. 28, 2015 (JP) ................. 2015-091163
Aug. 25, 2015 (JP) ................. 2015-166054

(51) Int. Cl.
*B23P 21/00* (2006.01)
*B25J 9/00* (2006.01)
(Continued)

(52) U.S. Cl.
CPC ............. *B23P 21/004* (2013.01); *B23P 19/04* (2013.01); *B23P 21/008* (2013.01);
(Continued)

(58) Field of Classification Search
CPC ....... B25J 9/04; B25J 9/08; B25J 9/123; B25J 9/1005; B25J 9/144; B25J 9/1687;
(Continued)

(56) References Cited

U.S. PATENT DOCUMENTS 4,872,257 A * 10/1989 Wakamori ............ B07C 5/3412
29/701
4,919,586 A 4/1990 Derby
(Continued)

FOREIGN PATENT DOCUMENTS

CN 101157217 A 4/2008
CN 202357168 U 8/2012
(Continued)

OTHER PUBLICATIONS

Search Report issued in European Patent Application No. 15187304. 9, dated Mar. 10, 2016.
(Continued)

*Primary Examiner* — Jermie Cozart
(74) *Attorney, Agent, or Firm* — Venable LLP

(57) ABSTRACT

An automated assembly apparatus comprises an assembly robot that includes a Y-axis movement unit, a first X-axis movement unit movable in a Y-axis direction along the Y-axis movement unit, and a grip unit movable in an X-axis direction along the X-axis movement unit, and a workbench unit including a Z-axis movement unit arranged below the assembly robot with respect to an Z-axis and a workbench movable in the Z-axis direction along the Z-axis movement unit, wherein an assembly operation for a first assembly component gripped by the grip unit and a second assembly component mounted on the workbench unit is performed through movement in the Z-axis direction by the workbench unit.

6 Claims, 16 Drawing Sheets

(51) Int. Cl.
 *B23P 19/04* (2006.01)
 *B25J 9/02* (2006.01)
(52) U.S. Cl.
 CPC ........... *B25J 9/0084* (2013.01); *B25J 9/0096* (2013.01); *B25J 9/023* (2013.01); *Y10T 29/49902* (2015.01)
(58) Field of Classification Search
 CPC ...... B25J 11/005; B25J 11/008; B25J 13/086; B25J 13/089; B25J 9/1617; B25J 9/1615; B25J 9/1612; B25J 9/10; B25J 9/026; B25J 9/0096; B25J 9/0087; B25J 9/0084; B25J 15/00; B25J 9/1676; B25J 9/1664; B25J 9/1656; B25J 9/023; G05B 19/41815; G05B 2219/31079; G05B 2219/31081; B23P 19/105; B23P 21/008; B23P 21/004; B23P 21/00; Y10T 29/49902
 See application file for complete search history.

(56) References Cited

U.S. PATENT DOCUMENTS

| | | | | |
|---|---|---|---|---|
| 5,271,139 | A * | 12/1993 | Sticht | B23P 21/004 198/346.1 |
| 5,539,975 | A * | 7/1996 | Kukuljan | B23P 21/004 198/346.2 |
| 6,519,837 | B1 * | 2/2003 | Ichikawa | B23P 21/004 29/720 |
| 6,591,488 | B1 * | 7/2003 | Tachibana | B23P 19/001 29/771 |
| 2002/0064447 | A1 * | 5/2002 | Gurevich | B25J 9/023 414/749.1 |
| 2010/0014948 | A1 * | 1/2010 | Higashida | H05K 13/0434 414/222.05 |

FOREIGN PATENT DOCUMENTS

| | | |
|---|---|---|
| CN | 103157975 A | 6/2013 |
| CN | 103507071 A | 1/2014 |
| EP | 0283403 A1 | 9/1988 |
| EP | 2894012 A1 | 7/2015 |
| JP | H8-323661 A | 12/1996 |
| TW | 201317076 A1 | 5/2013 |
| TW | M481413 U | 7/2014 |
| WO | 2014-037993 A1 | 3/2014 |
| WO | 2014-11820 A1 | 8/2014 |

OTHER PUBLICATIONS

Office Action dated Oct. 6, 2016, in Taiwanese Patent Appln. No. 104131849.
Chinese Office Action dated Apr. 27, 2017, in related Chinese Patent Application No. 201510639276.9 (with English translation).

* cited by examiner

AUTOMATED ASSEMBLY APPARATUS AND AUTOMATED ASSEMBLY METHOD

BACKGROUND OF THE INVENTION

Field of the Invention

The present invention relates to an automated assembly apparatus, an automated assembly system and an automated assembly method that use a robot.

Description of the Related Art

Conventionally, in an automated assembly apparatus using a robot, an orthogonal robot or an articulated (multi-joint) robot that grips an assembly component operates to assemble the assembly component into an assembly target component.

Japanese Patent Application Laid-Open No. H08-323661 discloses an automated assembly machine that includes: an orthogonal robot that includes joints linearly movable in respective X, Y and Z axes, and a joint rotatable in an X-Y plane; a jig robot that includes two rotational joints; and a controller that causes the robots to cooperate. The automated assembly machine in Japanese Patent Application Laid-Open No. H08-323661 can perform assembly operations in multiple directions.

Unfortunately, in the automated assembly machine disclosed in Japanese Patent Application Laid-Open No. H08-323661, the orthogonal robot includes a Z-axis movement unit, which increases the inertial force of a hand provided at a distal end of the robot during high speed movement. Consequently, assembly accuracy is reduced.

SUMMARY OF THE INVENTION

The present invention is to solve the problem which cannot be solved by such a conventional method. A holding unit for positioning and holding an assembly target component into which a component is to be assembled in each station, moves vertically or moves vertically and swings to thereby achieve accurate assembly operations.

The present invention has an object to reduce the moment of inertia that affects an assembly robot, thereby achieving an automated assembly apparatus, an automated assembly system and an automated assembly method that operate at a high speed and are highly accurate, at a low cost.

An automated assembly apparatus of the present invention includes: an assembly robot that includes a Y-axis movement unit, a first X-axis movement unit movable in a Y-axis direction along the Y-axis movement unit, and a grip unit movable in an X-axis direction along the X-axis movement unit; and a workbench unit including a Z-axis movement unit arranged below the assembly robot with respect to an Z-axis, and a workbench movable in the Z-axis direction along the Z-axis movement unit, wherein an assembly operation for a first assembly component gripped by the grip unit and a second assembly component mounted on the workbench unit is performed through movement in the Z-axis direction by the workbench unit.

As to an automated assembly system of the present invention in an automated assembly line where at least a first automated assembly apparatus and a second automated assembly apparatus are arranged adjacent to each other, the first automated assembly apparatus and the second automated assembly apparatus each include: an assembly robot that includes a grip unit of gripping an assembly component, an X-axis movement unit to which the grip unit is attached movably in the X-axis direction in the horizontal plane, and a Y-axis movement unit to which the X-axis movement unit is attached movably in the Y-axis direction; and a holding unit that holds an assembly target component for assembling the assembly component into the assembly target component. The assembly robot does not include a drive unit in the Z-axis direction. The holding unit includes a positioning unit that positions the assembly target component, and is movable in the X-axis direction and the Z-axis direction. As to the grip unit of the second automated assembly apparatus, the holding unit of the first automated assembly apparatus moves in the X-axis direction and the Z-axis direction, thereby allowing the grip unit to grip the assembly target component.

An automated assembly method of the present invention includes: providing at least a first automated assembly apparatus and a second automated assembly apparatus in a manner adjacent to each other; assembling a second component into a first component conveyed to the first automated assembly apparatus, in the first automated assembly apparatus; conveying the first component into which the second component has been assembled, to the second automated assembly apparatus; and assembling a third component into the component in the second automated assembly apparatus. The first automated assembly apparatus and the second automated assembly apparatus each include: an assembly robot that includes a Y-axis movement unit, a first X-axis movement unit movable in a Y-axis direction along the Y-axis movement unit, and a grip unit movable in an X-axis direction along the X-axis movement unit; and a workbench unit that is arranged below the assembly robot with respect to an Z-axis, and includes a second X-axis movement unit, a Z-axis movement unit movable in the X-axis direction along the second X-axis movement unit, and a workbench movable in the Z-axis direction along the Z-axis movement unit. The first component into which the second component has been assembled and which is mounted on the workbench unit of the first automated assembly apparatus is conveyed by the second X-axis movement unit from the first automated assembly apparatus to the second automated assembly apparatus, gripped by the grip unit of the second automated assembly apparatus through ascent of the workbench unit by the Z-axis movement unit, and mounted on the workbench of the second automated assembly apparatus.

Further features of the present invention will become apparent from the following description of exemplary embodiments with reference to the attached drawings.

BRIEF DESCRIPTION OF THE DRAWINGS

FIG. 2A is a schematic perspective view of the workbench unit that can be assembled in three directions. FIG. 2B is a schematic perspective view of the workbench unit that can be assembled in five directions.

FIG. 5A is the schematic perspective view in an initial state. FIG. 5B is the schematic perspective view in the case where an assembly component is conveyed to the adjacent apparatus.

DESCRIPTION OF THE EMBODIMENTS

Preferred embodiments of the present invention will now be described in detail in accordance with the accompanying drawings.

A first embodiment relates to an apparatus configuration of an automated assembly apparatus and an automated assembly method.

First Embodiment

As a basic embodiment to which the present invention is applied, a first embodiment is hereinafter specifically described with reference to FIG. 1. In the diagrams, the same portions are indicated by the same symbols.

Figure 1:
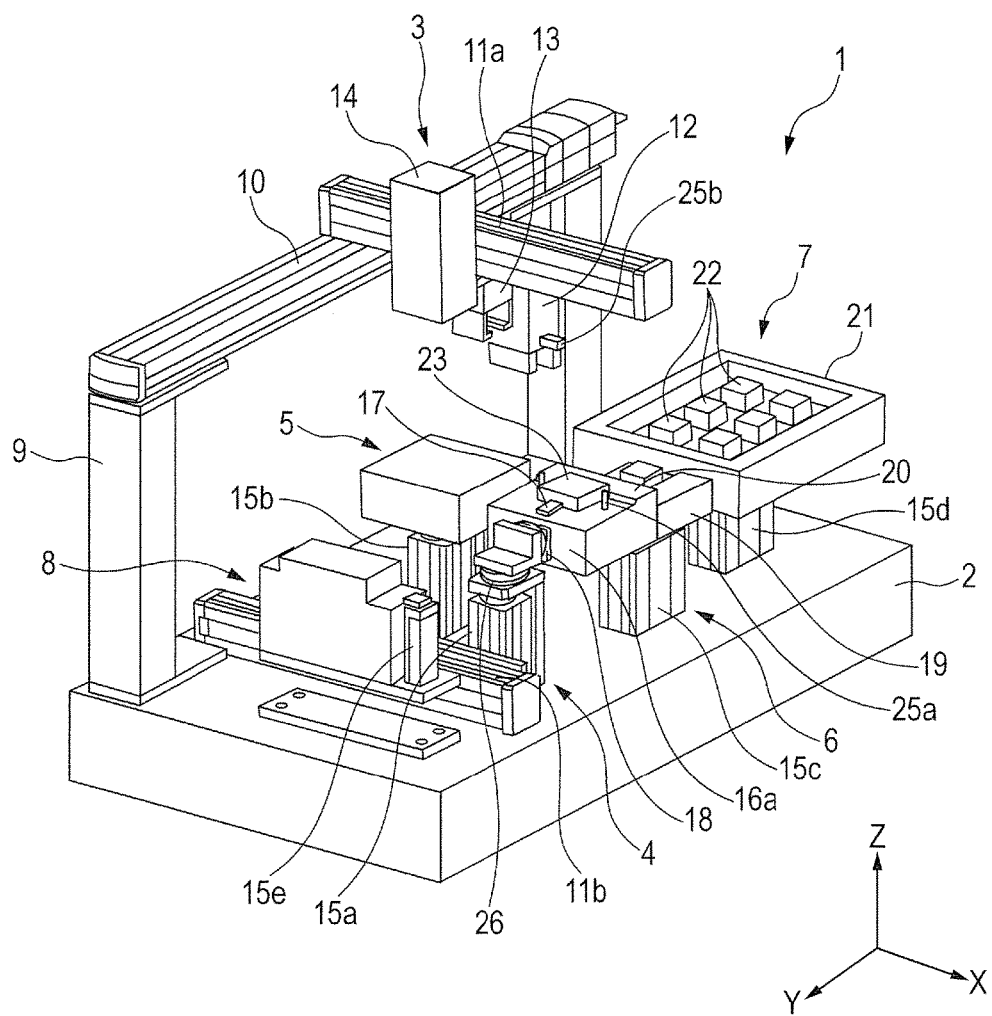
FIG. 1 is a schematic perspective view of an automated assembly method and an apparatus therefor according to a first embodiment of the present invention.

FIG. 1 is a schematic perspective view of an automated assembly method and an automated assembly apparatus according to the present invention. The automated assembly apparatus 1 includes an assembly robot 3 capable of moving in a horizontal plane, a first workbench unit (holding unit) 4, a second workbench unit 5, a positioning unit 6, a supply unit 7 and a screw supplying unit 8, which are arranged on a base 2.

The supply unit 7 includes a supply pallet 21 that contains at least one assembly component 22 in a manner capable of supplying the component. The assembly component 22 is gripped by an after-mentioned assembly hand 12 from the supply pallet 21.

The assembly robot 3 includes a Y-axis movement unit, an X-axis movement unit (first X-axis movement unit) that can move with respect to the Y-axis movement unit, and a grip unit that can move with respect to the X-axis movement unit. A guide rail of the Y-axis movement unit 10, which includes an electric slider, is provided on columns 9 fixed to the base 2. The X-axis movement unit 11a, which includes an electric slider, is attached to the guide rail of the Y-axis movement unit 10 in a manner movably in the Y-axis direction. The assembly hand 12, which is a grip unit, and a transfer hand 13 are attached movably in the X-axis direction to the guide rail of the X-axis movement unit 11a. In addition to the grip unit, a screw fastening unit 14 is also attached movably in the X-axis direction. The assembly hand 12 is provided with a through-hole 25b, which serves as a guide unit, thereby allowing positioning to an after-mentioned workbench 16a. The X-axis and the Y-axis are substantially orthogonal to each other. The X-axis and the Y-axis are in the same plane. The substantial orthogonality between the X-axis and the Y-axis indicates that the angle between the X-axis and the Y-axis is an angle of 90°±10°. It is appropriate that the X-axis and the Y-axis are orthogonal to each other.

In the first embodiment, the X-axis movement unit may be provided on the columns 9, the Y-axis movement unit may be movably attached to the X-axis movement unit, and the grip unit may be movably attached to the X-axis movement unit.

The first workbench unit (holding unit) 4 is arranged below the assembly robot 3 with respect to the Z-axis, and is for positioning and holding an assembly target component 23 to assemble the assembly component (second assembly component) 22 into the assembly target component (first assembly component) 23. An X-axis movement unit 11b (second X-axis movement unit), a Z-axis movement unit 15a and the workbench 16a are provided. On the workbench 16a there are a workpiece holding unit 17 for positioning and holding the assembly target component 23, and a guide unit 25a, and a compliance mechanism 26 that is freely movable in the X-axis direction, the Y-axis direction and a rotational direction.

Figure 2A:
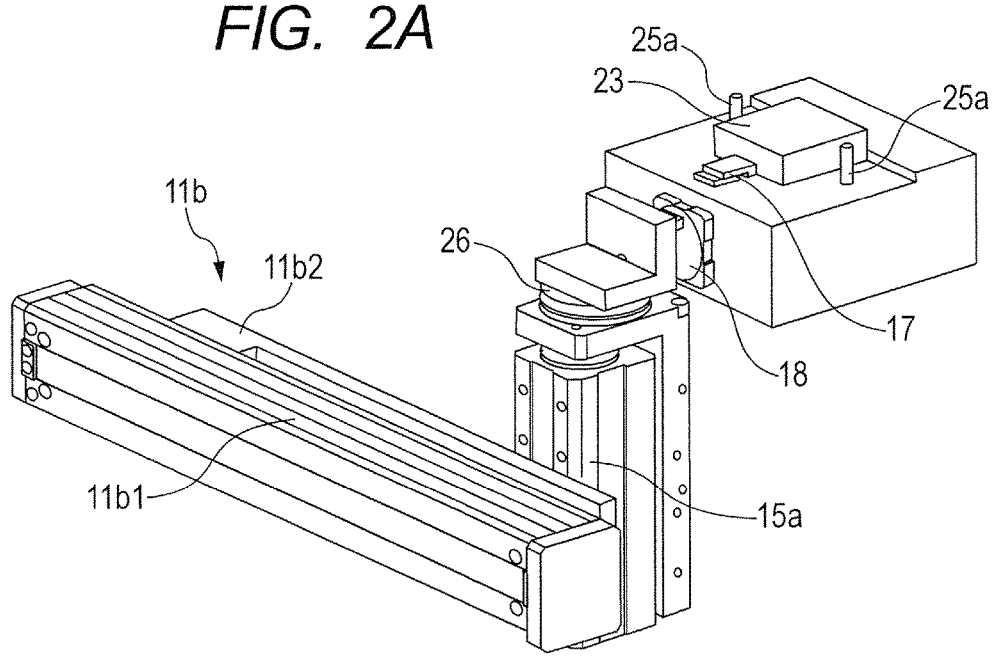
FIGS. 2A and 2B are schematic perspective views of workbench units according to the first embodiment of the present invention.
Figure 2B:
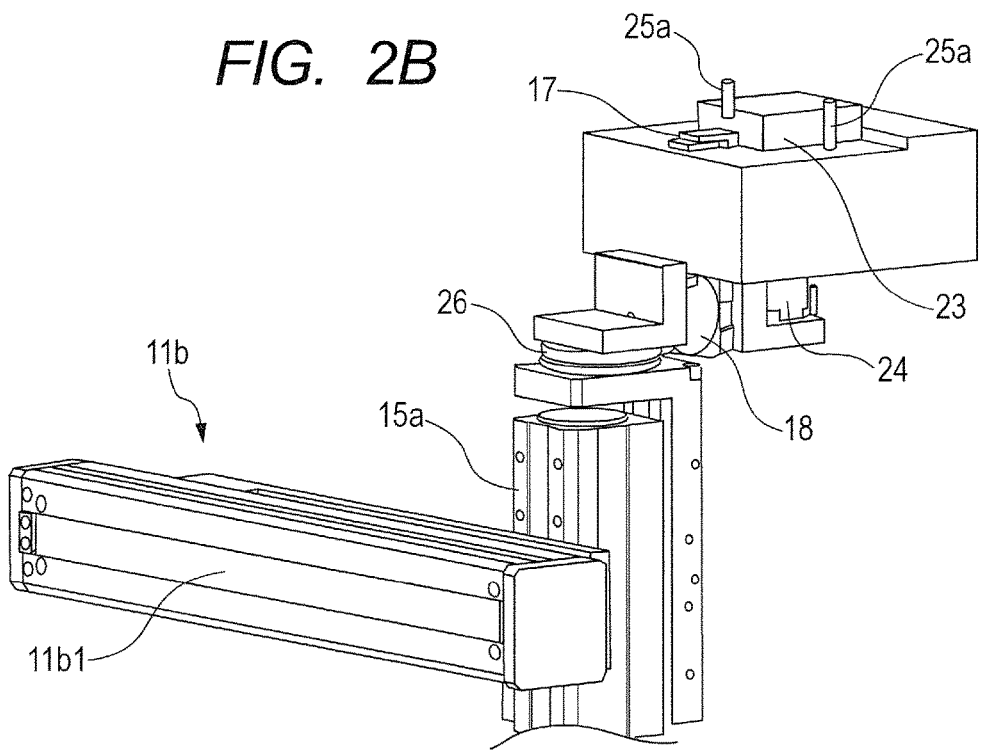

FIGS. 2A and 2B are schematic perspective views of the first workbench unit 4. The X-axis movement unit 11b includes a guide rail 11b1, and a mobile body 11b2 that moves in the X-axis direction along the guide rail 11b1 by a drive unit, which is not illustrated. The Z-axis movement unit 15a is attached to the mobile body 11b2 movably in the Z-axis direction.

The compliance mechanism 26 is provided with a lock and unlock mechanism. In the case where the workbench 16a and the assembly hand 12 are positioned with respect to each other, unlocking is performed to allow the workbench 16a to come into a movable state. In the other cases, locking is performed to allow the workbench 16a to be fixed. The first workbench unit 4 can be provided with a first swing unit 18 that allows the workbench 16a to freely rotate as necessary.

FIGS. 2A and 2B are schematic perspective views of the first workbench unit 4. FIG. 2A illustrates a state where the first swing unit 18 allows assembly in three directions. As illustrated in FIG. 2B, a second swing unit may be further provided to allow assembly in five directions.

The second workbench unit 5 is for conveying the assembly target component 23 to the automated assembly apparatus 1. As with the first workbench unit 4, the unit 5 can position and hold the assembly target component 23. The unit 5 includes a Z-axis movement unit 15b and a workbench 16b.

The assembly target component 23 is conveyed to the automated assembly apparatus 1 by a unit, which is not illustrated, and is mounted on the second workbench 16b. The assembly target component 23 mounted on the second workbench 16b can be positioned and held, as with the case of the first workbench unit 4.

The positioning unit 6 achieves accurate assembly by preliminarily positioning the assembly component 22. A positioning stage 19 is mounted on the Z-axis movement unit 15c. On the positioning stage 19, a positioning unit 20 is arranged. This unit 20 is engaged with the assembly component 22 to accurately define the phase of the assembly component 22 in the rotational direction and to position the assembly component 22 in the X and Y directions.

The supply unit 7 is for storing and supplying the assembly component 22, and has a configuration where the supply pallet 21 is mounted on the Z-axis movement unit 15d.

The supply pallet 7 may contain multiple types of assembly components. Alternatively, multiple types of pallets are arranged to supply multiple types of components.

The screw supplying unit 8 is for storing and supplying screws. A Z-axis movement unit 15e is provided at a distal end of the unit 8.

(Description of Operations of Automated Assembly Apparatus)

Next, a series of operations of automated assembly according to each embodiment of the present invention is specifically described with reference to FIG. 1. First, the assembly target component 23 is arranged on the workbench 16b by a conveyance unit, which is not illustrated.

After the assembly target component 23 is arranged, the transfer hand 13 provided at the assembly robot 3 moves to a position above the second workbench unit 5 through operations of the Y-axis movement unit 10 and the X-axis movement unit 11a. After the transfer hand 13 has moved to the position above the second workbench unit 5, the Z-axis movement unit 15b provided at the second workbench unit 5 is raised, and the transfer hand 13 grips the assembly target component 23 mounted on the workbench 16b.

After the assembly target component 23 is gripped, the Z-axis movement unit 15b is lowered. After this unit is lowered, the transfer hand 13 provided at the assembly robot 3 moves to a position above the first workbench unit 4 through operations of the Y-axis movement unit 10 and the X-axis movement unit 11a. After the transfer hand 13 has moved to the position above the first workbench unit 4, the Z-axis movement unit 15a provided at the first workbench unit 4 is raised, and the transfer hand 13 unchucks the assembly target component 23 to thereby mount this component 23 on the workbench 16a. After the Z-axis movement unit 15a is lowered, the workpiece holding unit 17 advances to thereby position and hold the assembly target component 23.

Next, the assembly hand 12 provided at the assembly robot 3 moves to a position above the supply unit 7 through operations of the Y-axis movement unit 10 and the X-axis movement unit 11a. After the assembly hand 12 has moved to the position above the supply unit 7, the Z-axis movement unit 15d provided at the supply unit 7 is raised. After this unit 7 has been raised, the assembly hand 12 grips the assembly component 22 arranged on the supply pallet 21.

After the supply unit 7 is lowered through an operation of the Z-axis movement unit 15d, the assembly hand 12 moves to a position above the positioning unit 6 through operations of the Y-axis movement unit 10 and the X-axis movement unit 11a. After the assembly hand 12 has moved to the position above the positioning unit 6, the Z-axis movement unit 15c provided at the positioning unit 6 is raised. After this unit 6 has been raised, the assembly hand 12 unchucks the assembly component 22 and mounts the assembly component 22 on the positioning stage 19.

After unchucking by the assembly hand 12, the positioning unit 20 advances to thereby improve the accuracies of the assembly component 22 in position in the X and Y directions and in the phase direction. The assembly hand 12 then grips again the assembly component 22 having the improved positional accuracies. The operations are not necessarily performed in every case. The operations on the positioning unit 6 are performed only in the case where accurate assembly operations are required.

After the operations of the positioning unit 6 have been completed, the assembly hand 12 moves to a position above the first workbench unit 4 through operations of the Y-axis movement unit 10 and the X-axis movement unit 11a. After the assembly hand 12 has moved to the position above the first workbench unit 4, the compliance mechanism 26 is unlocked to allow the workbench 16a to move.

After the workbench 16a is allowed to move, the Z-axis movement unit 15a provided at the first workbench unit 4 raises the workbench 16a. While this workbench is raised, the pin-shaped guide unit 25a is fitted into the through-hole 25b. Consequently, the compliance mechanism moves the workbench 16a to thereby position this workbench with respect to the assembly hand 12.

In the state where the workbench 16a is positioned, the workbench 16a is further raised to cause the assembly component 22 gripped by the assembly hand 12 to be fitted into the assembly target component 23, which is positioned and held by the workbench 16a. After the component is fitted, the assembly hand 12 unchucks the assembly component 22. The Z-axis movement unit 15a lowers the workbench 16a.

After the assembly component 22 is fitted into the assembly target component 23, the screw fastening unit 14 moves to a position above the screw supplying unit 8 through operations of the Y-axis movement unit 10 and the X-axis movement unit 11a. At the same time, a motor that is included in the screw fastening unit 14 but is not illustrated rotates a driver bit, not illustrated, in the screw fastening unit 14.

After the screw fastening unit 14 has moved to the position above the screw supplying unit 8, the screw fastening unit 14 sucks a screw using a sucking unit, not illustrated. The Z-axis movement unit 15e is raised, which in turn raises the screw supplying unit 8 in a state where this unit 8 holds a screw at the distal end of the unit 8. The screw supplying unit 8 is then stopped around the screw fastening unit 14, which sucks the screw, and the screw is passed to the screw fastening unit 14.

After the descent of the Z-axis movement unit 15e lowers the distal end of the screw supplying unit, the screw fastening unit 14 moves to a position above the first workbench unit 4 through operations of the Y-axis movement unit 10 and the X-axis movement unit 11a. After the screw fastening unit 14 has moved to the position above the first workbench unit 4, the Z-axis movement unit 15a provided at the first workbench unit 4 raises the workbench 16a. When the screw comes into contact with the assembly target component 23 during ascent, the torque starts to change. When the screw has been fastened, the torque has the maximum value. The point where the torque has the maximum value is detected to thereby stop a motor, which is included in the screw fastening unit 14 but is not illustrated, and the Z-axis movement unit 15a.

After the assembly component 22 is assembled into the assembly target component 23, the operation of the screw fastening unit 14 for fixing the assembly component 22 to the assembly target component 23 may be performed. The screw fastening unit 14 and the screw supplying unit 8 are required only in the case where a screw fastening step is to be performed. This step is not necessarily performed in every case. The component can be attached and detached as necessary. When the first swing unit 18 and the second swing unit 24 are used, an operation of assembling the assembly component 22 into the assembly target component 23 in multiple directions, and a fixing operation, such as screw fastening, can be performed.

After the assembly component 22 is fitted into or coupled to the assembly target component 23, the assembly step in the automated assembly apparatus 1 is finished. After the assembly step has been finished, the mobile body 11$b$2 of the X-axis movement unit 11$b$ provided at the first workbench unit 4 moves with respect to the guide rail 11$b$1 to thereby discharge the assembly target component 23 mounted on the workbench 16$a$ to the outside of the automated assembly apparatus 1.

According to the configuration and operations described above, the Z-axis movement unit 15$a$ that vertically moves in the Z-axis direction with respect to the assembly component 22 is thus provided at the first workbench unit 4, thereby reducing the moment of inertia that affects the assembly robot 3. Consequently, even when the Y-axis movement unit 10 and the X-axis movement unit 11$a$ move at high speeds, the vibrations of the assembly hand 12, the transfer hand 13 and the screw fastening unit 14 can be reduced to be small. As a result, accurate automated assembly can be achieved.

Furthermore, positioning of the first workbench unit 4 to the assembly hand 12 through the guide unit 25 and the compliance mechanism 26 can achieve more accurate assembly. The positioning through the guide unit 25 and the compliance mechanism 26 can be also performed in a positioning operation and a component pickup operation. Furthermore, the first workbench unit 4 thus includes the X-axis movement unit 11$b$. Consequently, the assembly target component 23 can be conveyed away with a small space.

Second Embodiment

Figure 3:
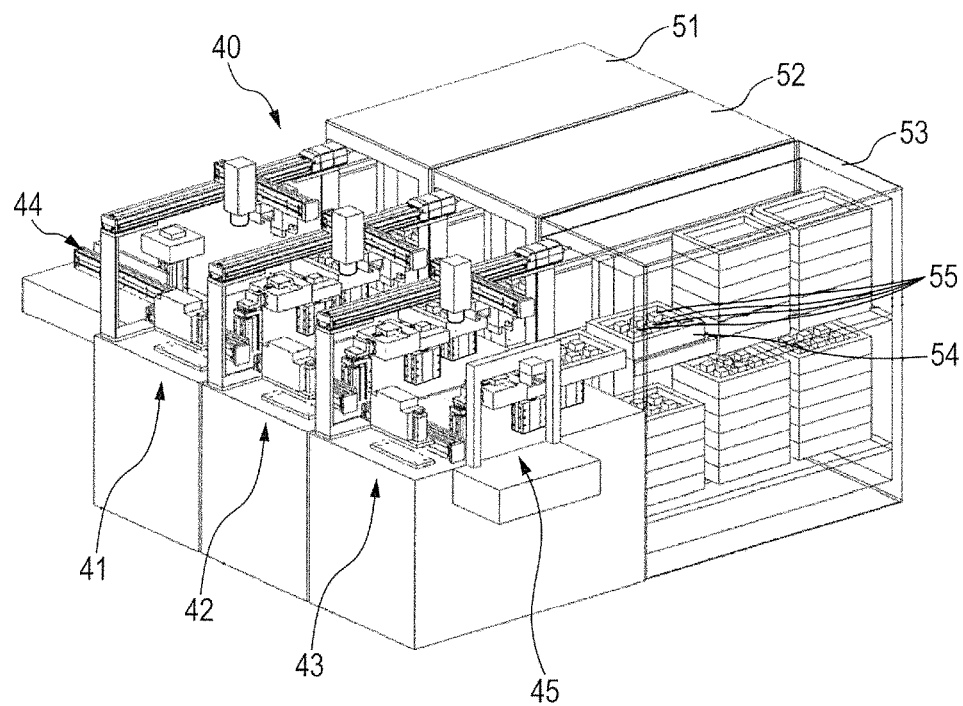
FIG. 3 is a schematic perspective view of an automated assembly system that uses automated assembly apparatuses according to a second embodiment.

As illustrated in FIG. 3, as with the first aspect, an automated assembly apparatus of a second embodiment includes: an assembly robot that does not include a drive unit in the Z-axis direction but includes drive units in the X-axis direction and the Y-axis direction; and a workbench unit that includes a Z-axis drive unit. As to the automated assembly apparatus of the second embodiment, multiple automated assembly apparatuses can be arranged to be used as an automated assembly system. The automated assembly system 40 where three automated assembly apparatuses 41, 42 and 43 are arranged and used is hereinafter described.

The automated assembly system 40 includes the automated assembly apparatuses 41, 42 and 43, and a stockers 51, 52 and 53 that stock components. Each of the stockers 51, 52 and 53 includes multiple supply pallets 54 that each store multiple assembly components 55.

In the automated assembly system 40, an assembly target component is fed from a feeding shifter 44 into the automated assembly apparatus 41 by a unit, not illustrated. The assembly target component assembled by the automated assembly apparatus 41 is conveyed to the automated assembly apparatus 42 by the workbench unit of the automated assembly apparatus 41 extending in a direction toward the automated assembly apparatus 42. A component assembling method is described later in detail. Likewise, the assembly target component assembled by the automated assembly apparatus 42 is conveyed to the automated assembly apparatus 43 by the workbench unit of the automated assembly apparatus 42. The assembly target component (not illustrated) assembled by the automated assembly apparatus 43 is mounted on a discharge unit 45. The assembly target component mounted on the discharge unit 45 is conveyed by a unit, not illustrated.

Figure 4:
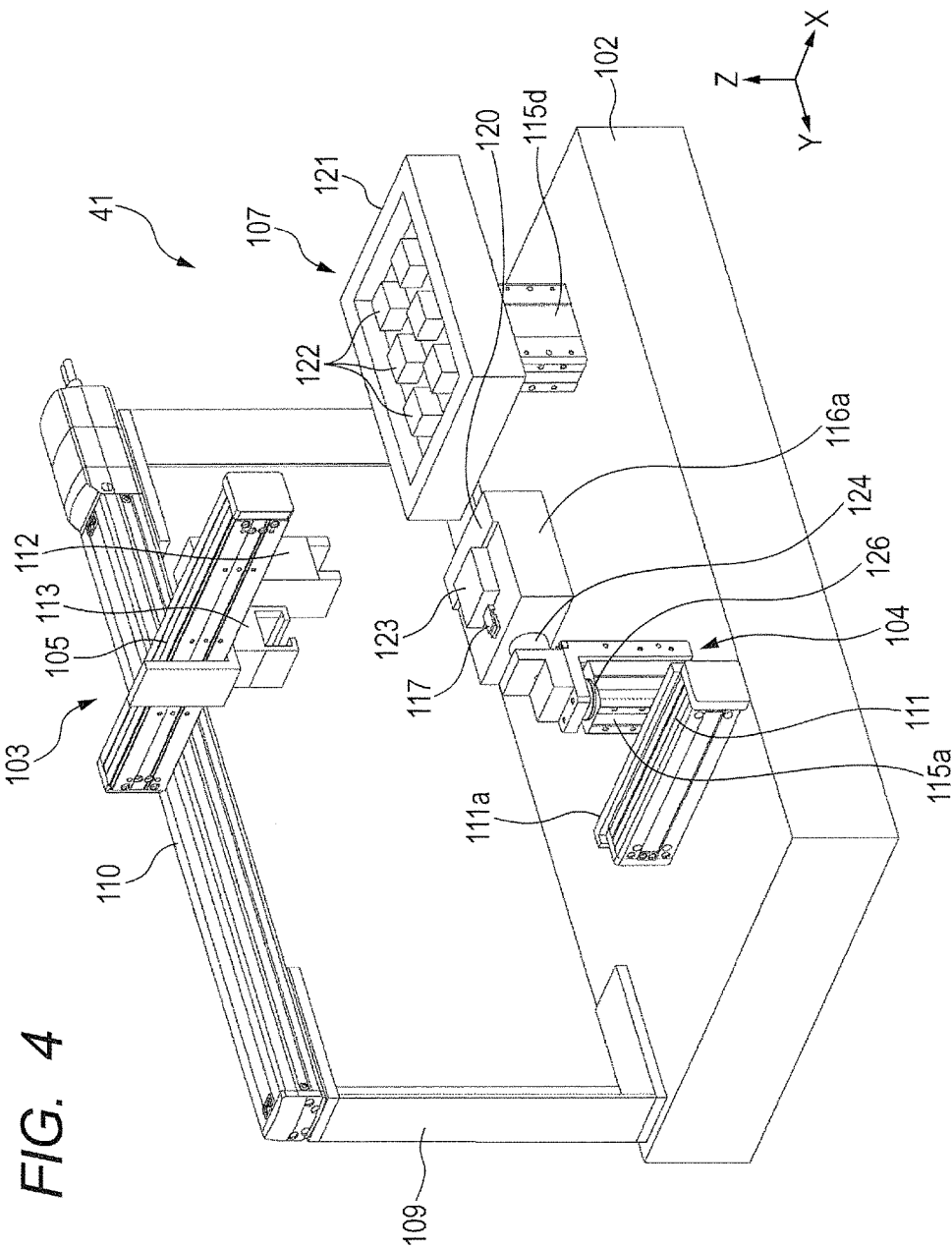
FIG. 4 is a schematic perspective view of the automated assembly apparatus used in the second embodiment.

FIG. 4 is a schematic perspective view of the automated assembly apparatus 41 of the automated assembly system 40.

FIG. 4 is a schematic perspective view of the assembly apparatus for illustrating the automated assembly method according to the present invention. Each automated assembly apparatus 41 is mounted on a base 102, and includes an assembly robot 103 that includes no drive unit in the height direction (Z-axis direction) but is movable in a horizontal plane (directions in X and Y-axes), a workbench unit 104, and a supply unit 7, The supply unit 107 includes a supply pallet 121 that contains at least one assembly component 122 in a manner capable of supplying the component. The assembly component 122 is gripped by an after-mentioned assembly hand 112 from the supply pallet 121.

The assembly robot 103 is attached to a first X-axis movement unit 105, which is movably attached to a guide rail of a Y-axis movement unit 110 provided on columns 109 fixed to the base 102. The guide rail of the first X-axis movement unit 105 is provided with at least one grip unit. In FIG. 1, two grip units, which are an assembly hand 112 and a transfer hand 113, are attached movably in the X-axis direction. The X-axis and the Y-axis are orthogonal to each other. The X-axis and the Y-axis are in the same plane.

The workbench unit (holding unit) 104 is a unit that positions and holds an assembly target component 123, which is a workpiece, for assembling the assembly component 122 into the assembly target component 123. The workbench unit (holding unit) 104 includes: a second X-axis movement unit 111; a Z-axis movement unit 115$a$; a workbench 116$a$ on which the assembly target component 123 can be mounted; a workpiece holding unit 117 for positioning and holding the assembly target component 123; and a compliance mechanism 126 that is freely movable in the X-axis direction, the Y-axis direction and the rotational direction. The second X-axis movement unit 111, which is an electric slider, is fixed to the base 102 by screws. A movable plate 111$a$, which is an L-shaped bracket, is fixed to a slider (not illustrated) of the second X-axis movement unit 111, which is the electric slider. The slider of the X-axis movement unit 111 moves in the X-axis direction to thereby cause the movable plate 111$a$ to extend in the X-axis direction. The movable plate 111$a$ is provided with a Z-axis movement unit 115$a$, which is an electric slider including an internal rod that can telescope.

The compliance mechanism 126 is provided with a lock and unlock mechanism. In the case where the workbench 116$a$ and the assembly hand 112 are positioned with respect to each other, unlocking is performed to allow the workbench 116$a$ to come into a movable state. Locking is performed in other cases, where a swing unit 124, which can be provided, allows the workbench 116$a$ to freely rotate.

The supply unit 107 is for storing and supplying the assembly component 122, and has a configuration where the supply pallet 121 is mounted on the Z-axis movement unit 115d. The supply pallet 121 may contain multiple types of assembly components. Alternatively, multiple types of pallets may be arranged to supply multiple types of components.

(Description of Operations of Automated Assembly Apparatus)

Figure 5A:
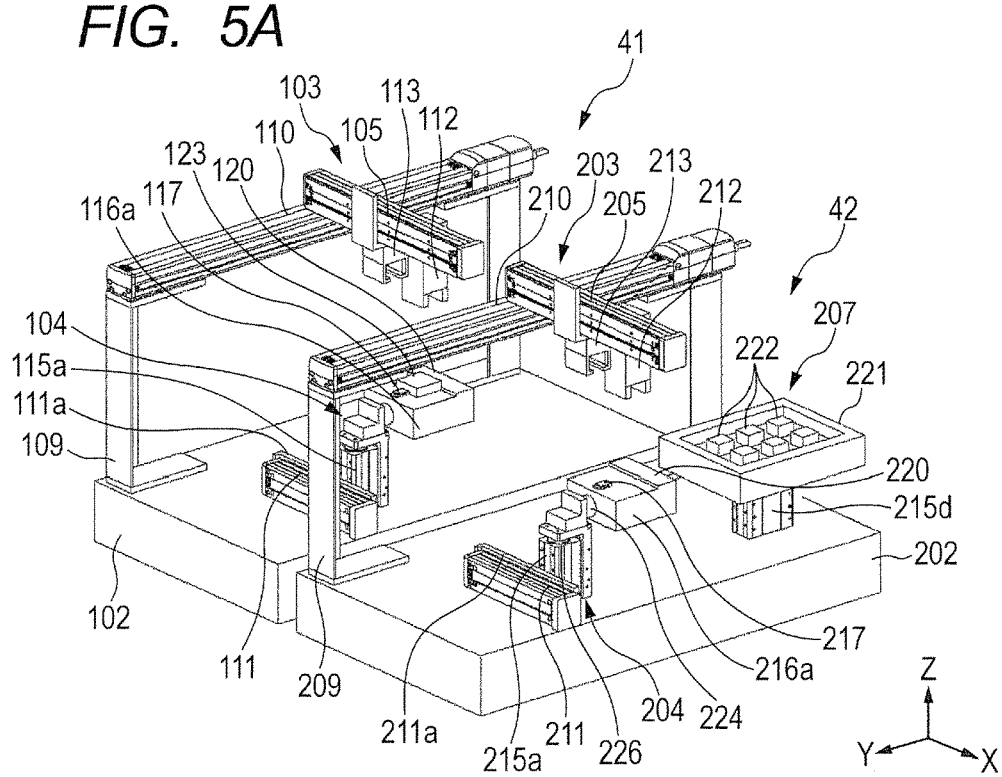
FIGS. 5A and 5B are schematic perspective views of a case where the automated assembly apparatuses according to the second embodiment are arranged.
Figure 5B:
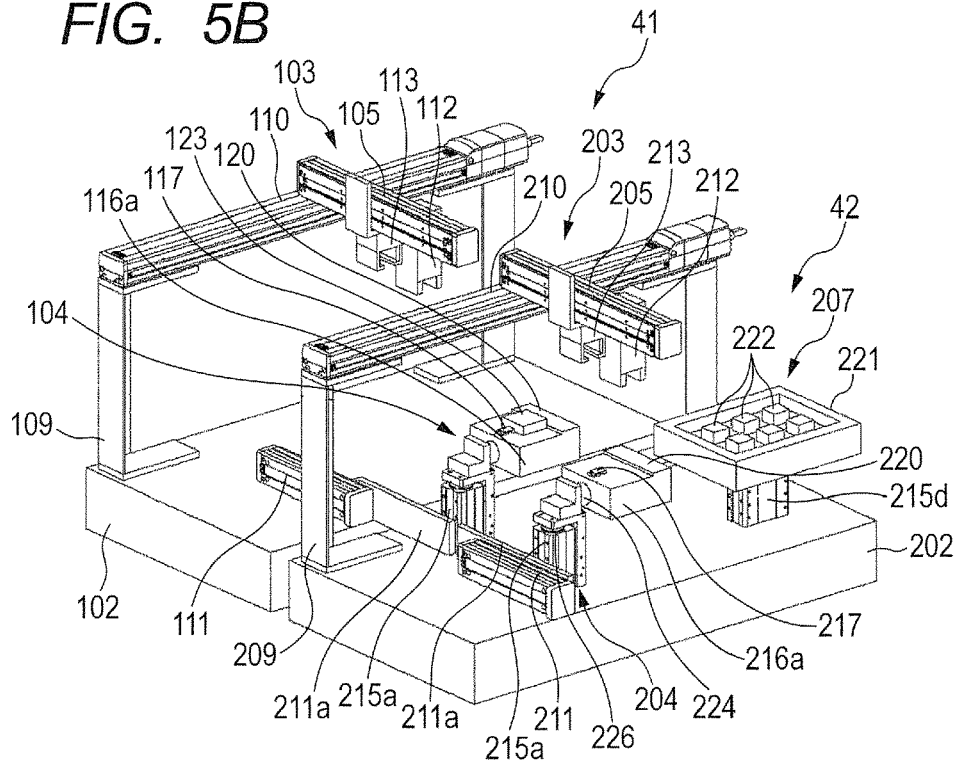

Next, a series of operations of automated assembly according to each embodiment of the present invention is specifically described with respect to FIGS. 5A and 5B.

FIGS. 5A and 5B are schematic perspective views in the case where an automated assembly apparatus 41, which is a first automated assembly apparatus according to the present invention, and another automated assembly apparatus 42, which is a second automated assembly apparatus, are arranged in parallel. FIG. 5A illustrates an initial state where a second X-axis movement unit 111 serving as a conveyor for an assembly target component 123 is in the automated assembly apparatus 41. As illustrated in FIG. 5B, the second X-axis movement unit 111 extends to allow the assembly target component 123 to be conveyed. Alternatively, the second X-axis movement unit 111 may be swung around a swing axis, not illustrated, to thereby convey the assembly target component 123. The configurations of the automated assembly apparatuses 41 and 42 are each similar to the configuration illustrated in FIG. 1. Here, the first automated assembly apparatus 41 and the second automated assembly apparatus 42 are the same apparatuses. Alternatively, the apparatuses may have different configurations.

The second X-axis movement unit 111 includes a movable plate 111a to which a Z-axis movement unit 115a is fixed. The movable plate 111a can be moved in the X-axis direction by being driven by the second X-axis movement unit 111. The movement of the movable plate 111a, in turn, moves a workbench 116a in the X-axis direction. A second X-axis movement unit 211 has a similar configuration. Movement of a movable plate 211a moves to and fro a workbench 216a in the X-axis direction.

After assembly at the automated assembly apparatus 41 has been completed, the slider of the second X-axis movement unit 111, which is an electric slider, moves and the movable plate 111a extends toward the automated assembly apparatus 42, as illustrated in FIG. 5B. Consequently, the workbench 116a moves into a work area of the automated assembly apparatus 42. The movement length of the movable plate 111a may be set by a user.

A transfer hand 213 provided at an assembly robot 203 moves to a position above the workbench 116a through operations of the Y-axis movement unit 210 and the first X-axis movement unit 205. After the transfer hand 213 has moved to the position above the workbench 116a, the Z-axis movement unit 115a provided at the workbench unit (holding unit) 104 is raised, and the transfer hand 113 grips the assembly target component 123 (the assembly component has been assembled by automated assembly apparatus 41) mounted on the workbench 116a.

After the assembly target component 123 is gripped, the Z-axis movement unit 115a is lowered. After this unit is lowered, the second X-axis movement unit 111 retracts toward the automated assembly apparatus 41 to move the workbench 116a back to the original position of the automated assembly apparatus 41.

The workbench unit (holding unit) 204 has a configuration substantially similar to the configuration of the workbench unit 104. The workbench unit 204 is a unit that positions and holds the assembly target component 123, for assembling an assembly component 222 into the assembly target component 123. This unit 204 includes: a second X-axis movement unit 211 that serves as a conveyor for the assembly target component 123; a Z-axis movement unit 215a; a workbench 216a; a workpiece holding unit 217 for positioning and holding the assembly target component 123; and a compliance mechanism 226 that is freely movable in the X-axis direction, the Y-axis direction and the rotational direction.

The compliance mechanism 226 is provided with a lock and unlock mechanism. In the case where the workbench 216a and the assembly hand 212 are positioned with respect to each other, unlocking is performed to allow the workbench 216a to come into a movable state. Locking is performed in other cases, where a swing unit 224, which can be provided, allows the workbench 216a to freely rotate.

The transfer hand 213 provided at the assembly robot 203 moves to a position above the workbench unit 204 through operations of the Y-axis movement unit 210 and the first X-axis movement unit 205.

After the transfer hand 213 has moved to the position above the workbench unit 204, the Z-axis movement unit 215a provided at the workbench unit 204 is raised, and the transfer hand 213 unchucks the assembly target component 123 to thereby mount this component 123 on the workbench 216a. After the Z-axis movement unit 215a is lowered, the workpiece holding unit 217 advances to thereby position and hold the assembly target component 123.

Next, after the workpiece holding unit 217 advances, the assembly hand 212 provided at the assembly robot 203 moves to a position above the supply unit 207 through operations of the Y-axis movement unit 210 and the first X-axis movement unit 205. After the assembly hand 212 has moved to the position above the supply unit 207, the Z-axis movement unit 215d provided at the supply unit 207 is raised. After this unit 207 has been raised, the assembly hand 212 grips the assembly component 222 arranged on the supply pallet 221.

After the supply unit 207 is lowered through an operation of the Z-axis movement unit 215d, the assembly hand 212 moves to a position above the workbench unit 204 through operations of the Y-axis movement unit 210 and the first X-axis movement unit 205.

After the assembly hand 212 has moved to the position above the workbench unit 204, the Z-axis movement unit 215a provided at the workbench unit 204 raises the workbench 216a. The workbench 216a is thus raised to cause the assembly component 222 gripped by the assembly hand 212 to be fitted into the assembly target component 123, which is positioned and held by the workbench 216a. After the component is fitted, the assembly hand 212 unchucks the assembly component 222. The Z-axis movement unit 215a lowers the workbench 216a.

After the assembly component 222 is fitted into or coupled to the assembly target component 123 and the assembly step in the automated assembly apparatus 42 is finished, the second X-axis movement unit 211 provided at the workbench unit 204 operates. This operation causes the assembly target component 123 mounted on the workbench 216a to be discharged to the outside of the automated assembly apparatus 42.

According to the configuration and operations of the second embodiment having been described above, the conveyor moves from the automated assembly apparatus only during conveyance. Consequently, in the case of moving to and fro (mates and demates) a configuration element of the automated assembly apparatus, the configuration element is moved while not necessarily considering interference with an adjacent automated assembly apparatus. Therefore, the time required to change the line configuration can be reduced. Furthermore, the conveyor thus has the mechanism for extending and swinging so as to allow the conveyor to enter the adjacent automated assembly apparatus. This mechanism negates the need to move the configuration element for adjusting the position during change in line configuration. Accordingly, the time required to change the line configuration can be further reduced.

Third Embodiment

Next, a third embodiment according to the present invention is specifically described with reference to FIGS. 6A to 6E. Automated assembly apparatuses 41a and 42a according to the third embodiment are the same as the automated assembly apparatuses 41 and 42 described in the second embodiment, except for after-mentioned linear cylinders 133 and 233 and regulation units 134 and 234.

Figure 6A:
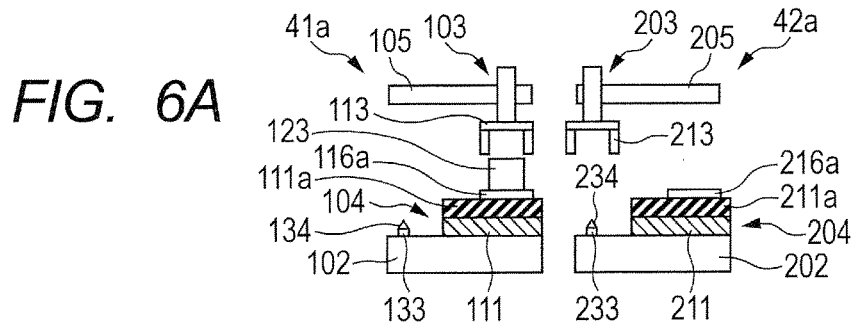
FIGS. 6A, 6B, 6C, 6D and 6E are schematic views of conveyance and transfer operations for an assembly target component according to a third embodiment.

FIG. 6A illustrates a state where an assembly target component 123 having been subjected to assembly operations in the automated assembly apparatus 41a is mounted on a workbench 116a of the automated assembly apparatus 41a.

Figure 6B:
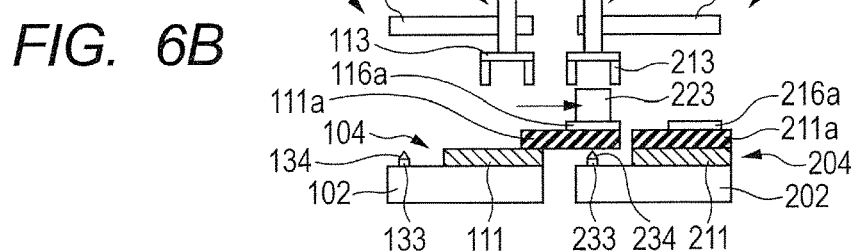

Next, in FIG. 6B, the second X-axis movement unit 111 of the automated assembly apparatus 41a extends in a direction toward the automated assembly apparatus 42a to thereby cause the workbench 116a of the automated assembly apparatus 41a to enter the inside of the automated assembly apparatus 42a. Alternatively, the second X-axis movement unit 111 may be configured to be swung to thereby convey the assembly target component 123.

Figure 6C:
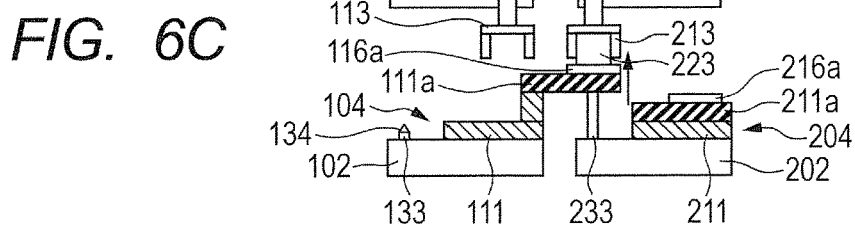

Furthermore, in FIG. 6C, the transfer hand 213 provided at the assembly robot 203 moves to a position above the workbench 116a having entered the inside of the automated assembly apparatus 42a, through operations of a Y-axis movement unit, not illustrated, and a first X-axis movement unit 205. After the transfer hand 213 has moved to the position above the workbench 116a, the linear cylinder 233 of the automated assembly apparatus 42a operates to thereby raise the movable plate 111a of the second X-axis movement unit 111 and the workbench 116a fixed to the movable plate 111a.

In this case, the regulation unit 234 for a positioning pin provided at the distal end of the linear cylinder 233 is fitted into a pinhole (not illustrated) provided in the rear surface of the workbench 116a, thereby moving the workbench 116a to allow positioning to the automated assembly apparatus 42a. The pinhole has a shape that flares toward the surface. Next, the transfer hand 213 grips the assembly target component 123 mounted on the workbench 116a. At this time, the linear cylinder 233 does not operate. Transfer of the assembly target component 123 from the automated assembly apparatus 41a to the automated assembly apparatus 42b has thus been completed. The automated assembly apparatus 41a also includes the linear cylinder 133 and the regulation unit 134 that have functions similar to those in the automated assembly apparatus 42b.

Figure 6D:
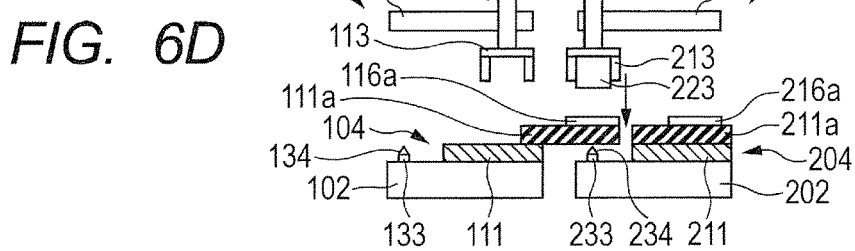

After the transfer of the assembly target component 123 has been completed, the linear cylinder 233 is lowered to move the second X-axis movement unit 111 back to the initial height, as illustrated in FIG. 6D.

Figure 6E:
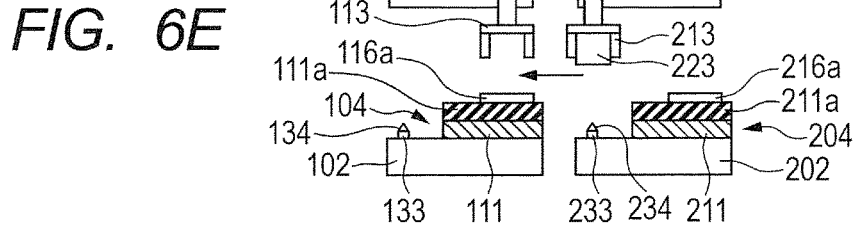

After this unit is lowered, the second X-axis movement unit 111 retracts toward the automated assembly apparatus 41a to move the workbench unit 104 back to the original position of the automated assembly apparatus 41a. FIG. 6E illustrates this state.

The configuration and operations of the third embodiment having been described above negate the need to link the automated assembly apparatus 41a and 42a to each other. The regulation unit provided at the automated assembly apparatus 42a positions the workbench 116a of the automated assembly apparatus 41a and the automated assembly apparatus 42a to each other, thereby allowing accurate assembly. Furthermore, the adjustment time after change in line configuration can be reduced.

Fourth Embodiment

Next, a fourth embodiment according to the present invention is specifically described with reference to FIGS. 7A to 7E. Automated assembly apparatuses 41b and 42b according to the fourth embodiment are the same as the automated assembly apparatuses 41 and 42 described in the second embodiment, except for after-mentioned regulation units 334 and 434.

Figure 7A:
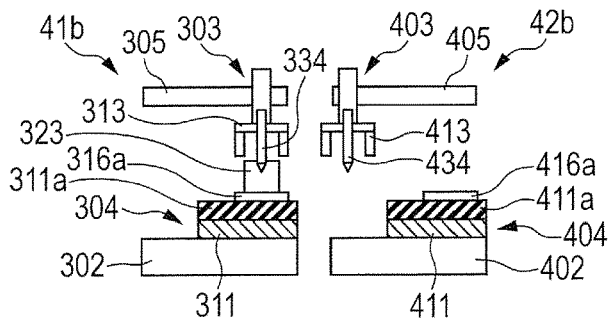
FIGS. 7A, 7B, 7C, 7D and 7E are schematic views of conveyance and transfer operations for an assembly target component according to a fourth embodiment.

In FIG. 7A, an assembly target component 323 having been subjected to assembly operations in the automated assembly apparatus 41b is mounted on a workbench 316a.

Figure 7B:
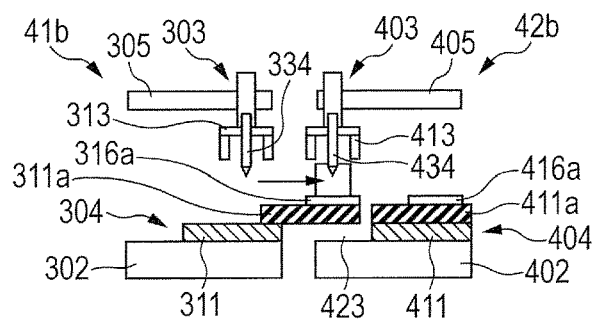

In FIG. 7B, the second X-axis movement unit 311 of the automated assembly apparatus 41b extends to thereby cause the workbench 316a of the automated assembly apparatus 41b to enter the inside of the automated assembly apparatus 42b. Alternatively, the second X-axis movement unit 311 may be configured to be swung to thereby convey the assembly target component 323.

Figure 7C:
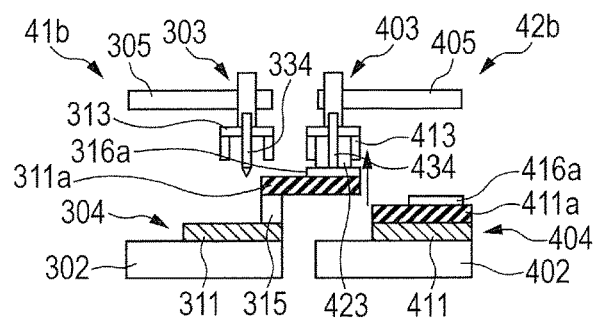

Next, in FIG. 7C, the transfer hand 413 provided at the assembly robot 403 moves to a position above the workbench 316a having entered the inside of the automated assembly apparatus 42b, through operations of a Y-axis movement unit, not illustrated, and a first X-axis movement unit 405. After the transfer hand 413 has moved to the position above the workbench 316a, the workbench 316a and the second X-axis movement unit 311 are raised through an operation of the Z-axis movement unit 315 of the automated assembly apparatus 41b.

In this case, the regulation unit 434 for a positioning pin provided at the transfer hand 413 is fitted into a pinhole (not illustrated) provided in the front surface of the workbench 316a, thereby moving the workbench 316a to allow positioning to the transfer hand 413. The pinhole has a shape that flares toward the surface. Next, the transfer hand 413 grips the assembly target component 323 mounted on the workbench 316a. At this time, the linear cylinder 433 does not operate. The transfer operation for the assembly target component 323 from the automated assembly apparatus 41b to the automated assembly apparatus 42b has thus been completed.

Figure 7D:
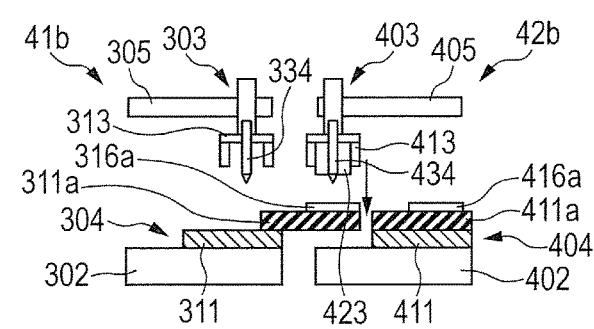

Next, after the transfer operation for the assembly target component 323 has been completed, the linear cylinder 433 is then lowered to move the second X-axis movement unit 311 back to the initial height, as illustrated in FIG. 7D.

Figure 7E:
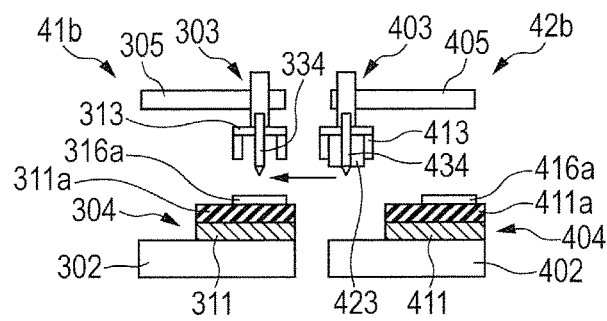

After this unit is lowered, the second X-axis movement unit 311 retracts toward the automated assembly apparatus 41b to move the workbench unit 304 back to the original position of the automated assembly apparatus 41b. FIG. 7E illustrates this state.

The configuration and operations of the fourth embodiment having been described above negate the need to link the automated assembly apparatus 41b and 42b to each other. The regulation unit provided at the transfer hand 413 of the automated assembly apparatus 42b positions the workbench 316a of the automated assembly apparatus 41b and the transfer hand 413 of the automated assembly apparatus 42b to each other, thereby allowing accurate assembly. Furthermore, the adjustment time after change in line configuration can be reduced.

Fifth Embodiment

Next, a fifth embodiment according to the present invention is specifically described with reference to FIGS. 8A to 8E. Automated assembly apparatuses 41c and 42c according to the fifth embodiment are the same as the automated assembly apparatuses 41 and 42 described in the second embodiment, except for after-mentioned regulation units 534 and 634.

Figure 8A:
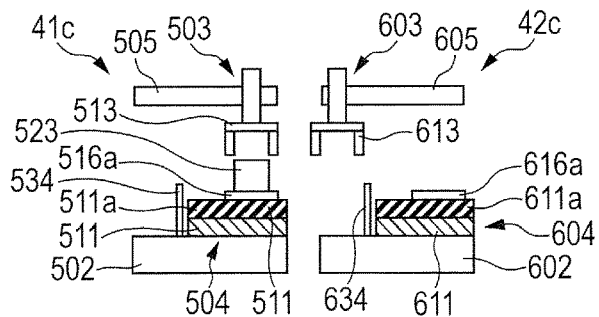
FIGS. 8A, 8B, 8C, 8D and 8E are schematic views of conveyance and transfer operations for an assembly target component according to a fifth embodiment.

In FIG. 8A, an assembly target component 423 having been subjected to assembly operations in the automated assembly apparatus 41c is mounted on a workbench 516a of the automated assembly apparatus 41c.

Figure 8B:
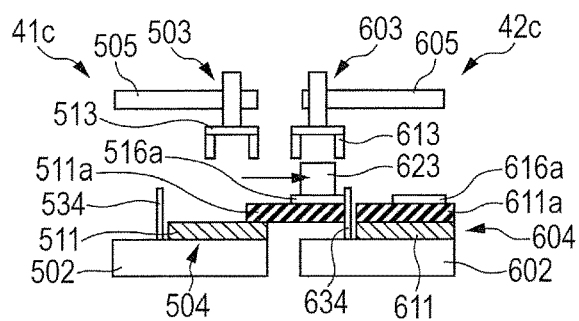

In FIG. 8B, the second X-axis movement unit 511 of the automated assembly apparatus 41c extends to thereby cause the workbench 516a of the automated assembly apparatus 41c to enter the inside of the automated assembly apparatus 42c. Alternatively, the second X-axis movement unit 511 may be configured to be swung to thereby convey the assembly target component 523.

Figure 8C:
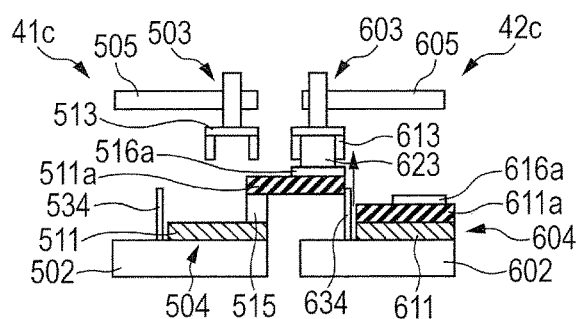

Next, in FIG. 8C, the transfer hand 613 provided at the assembly robot 603 moves to a position above the workbench 516a of the automated assembly apparatus 41c through operations of the Y-axis movement unit 610 (see FIGS. 2A and 2B) and the first X-axis movement unit 605. After the transfer hand 613 has moved to the position above the workbench 516a of the automated assembly apparatus 41c, the workbench 516a and the second X-axis movement unit 511 are raised through an operation of the Z-axis movement unit 515 of the automated assembly apparatus 41c.

In this case, the regulation unit 634, which is provided on the base 602 of the automated assembly apparatus 42c and regulates the position in the X-axis direction, comes into contact with the second X-axis movement unit 511, which serves as a conveyor, or the workbench 516a. Consequently, when the workbench 516a moves, positioning to the automated assembly apparatus 41c is performed. When the second X-axis movement unit 511 or the workbench 516a comes into contact with the regulation unit 634, movement of the workbench 516a by the second X-axis movement unit 511 is stopped. The regulation unit 634 may have an L-shape and regulate the position in the X-axis direction and the Y-axis direction. Next, the transfer hand 613 grips the assembly target component 523 mounted on the workbench 516a. At this time, the linear cylinder 633 does not operate. The transfer operation for the assembly target component 523 from the automated assembly apparatus 41c to the automated assembly apparatus 42c has thus been completed.

Figure 8D:
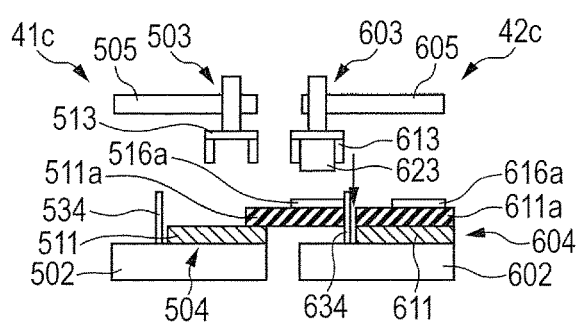

After completion of the transfer of the assembly target component 523, the linear cylinder is lowered. FIG. 8D illustrates this state.

Figure 8E:
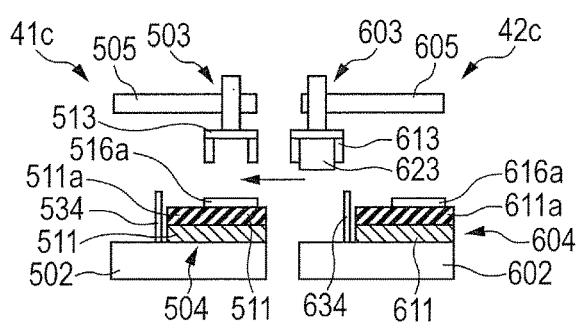

After this unit is lowered, the second X-axis movement unit 511 retracts toward the automated assembly apparatus 41c to move the workbench unit 504 back to the original position of the automated assembly apparatus 41c. FIG. 8E illustrates this state.

The configuration and operations of the fifth embodiment according to the present invention, which have been described above, negate the need to link the automated assembly apparatus 41c and 42c to each other. The regulation unit provided at the automated assembly apparatus 42c positions the workbench 516a of the automated assembly apparatus 41c and the automated assembly apparatus 42c to each other, thereby allowing accurate assembly. Furthermore, the adjustment time after change in line configuration can be reduced.

In each of the third to fifth embodiments having been described above, the two automated assembly apparatuses are arranged in parallel. Alternatively, three or more automated assembly apparatuses can be arranged to constitute one automated assembly system (production line) and perform multiple operations.

In each of the third to fifth embodiments having been described above, at least one of the X-axis, Y-axis and Z-axis directions may be regulated by the regulation unit while the workbench is raised by the Z-axis movement unit.

In each of the third to fifth embodiments having been described above, in the case of adopting the positioning pin and the pinhole, the positions where the positioning pin and the pinhole having been described above are provided may be replaced with each other.

Sixth Embodiment

Hereinafter, a sixth embodiment of the present invention is specifically described with reference to FIGS. 9 and 10.

Figure 9:
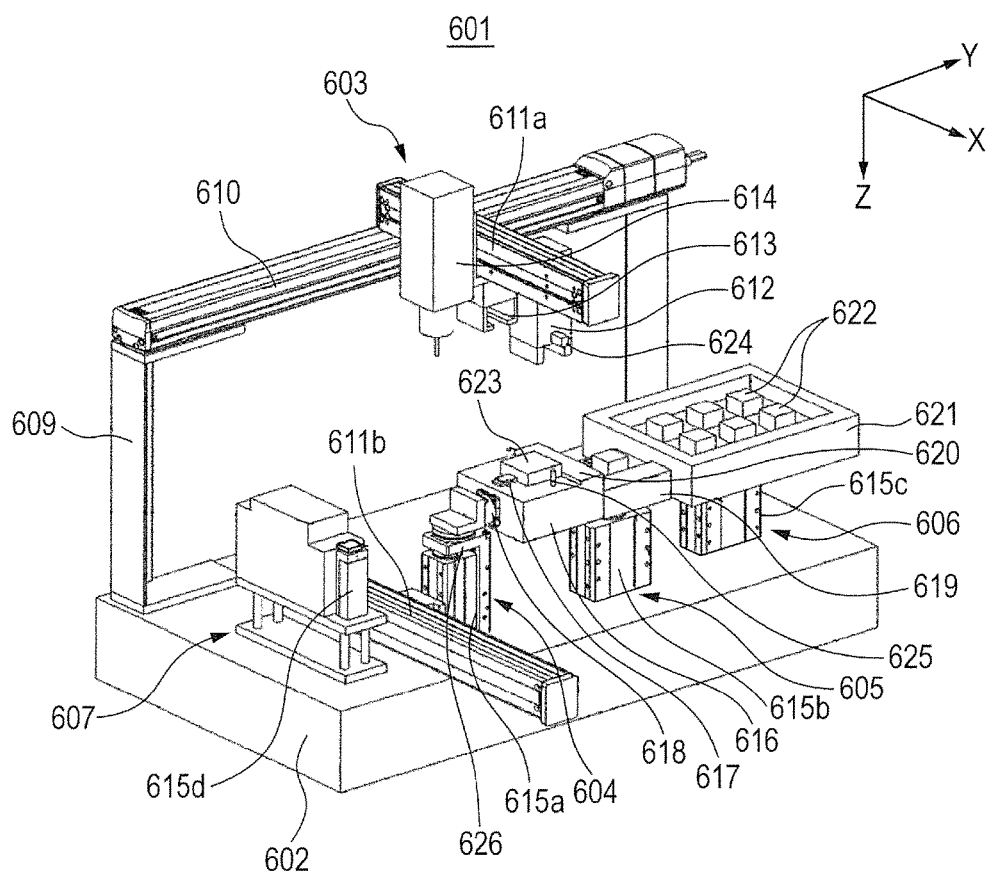
FIG. 9 is a schematic perspective view of an automated assembly apparatus according to a sixth embodiment.

FIG. 9 is a schematic perspective view of such an automated assembly apparatus according to the present invention. The automated assembly apparatus 601 includes an assembly robot 603 capable of moving in a horizontal plane, a workbench unit (holding unit) 604, a positioning unit 605, a supply unit 606 and a screw supplying unit 607, which are arranged on a base 602. The assembly robot 603 includes a transfer hand (grip unit) 613 that grips an assembly component 622, an X-axis movement unit 611a and a Y-axis movement unit 610. The grip unit 613 is attached to the X-axis movement unit 610 movably in the X-axis direction in a horizontal plane. The X-axis movement unit 611a is attached to the Y-axis movement unit 610 movably in the Y-axis direction. The assembly robot 603 is provided on columns 609 fixed onto the base 602.

Two grip units, which are an assembly hand 612 and a transfer hand 613, and a screw fastening unit 614 are attached to the X-axis movement unit 611a movably in the X-axis direction.

The assembly hand 612 has a through-hole 624. A pin-shaped guide unit 625 of a workbench 616, which is described later, is fitted into the through-hole 624, thereby allowing the assembly hand 612 and the workbench 616 to be positioned to each other. The X-axis and the Y-axis are substantially orthogonal to each other. The X-axis and the Y-axis are in the same plane. The substantial orthogonality between the X-axis and the Y-axis indicates that the angle between the X-axis and the Y-axis is an angle of 90°±10°. It is appropriate that the X-axis and the Y-axis are actually orthogonal to each other.

The workbench unit (holding unit) 604 is a unit that positions and holds an assembly target component 623, for assembling the assembly component 622 into the assembly target component 623. The workbench unit 604 includes: an X-axis movement unit (drive unit in the X-axis direction) 611b, which is an electric slider; and a Z-axis movement unit (raising and lowering drive unit in the Z-axis direction) 615a, which is an electric slider. Furthermore, this unit 604 includes: a workbench 616; a workpiece holding unit 617 that holds a workpiece mounted on the workbench; a swing unit 618; a guide unit 625; and a compliance mechanism 626 that can freely move in the X-axis direction, the Y-axis direction and the rotational direction. The X-axis movement unit (drive unit in the X-axis direction) 611b is fixed onto the base 602. The X-axis movement unit 611b is provided with the Z-axis movement unit 615a (raising and lowering drive unit in the Z-axis direction). The Z-axis movement unit is provided with the workbench 616. A rod in the Z-axis movement unit 615a telescopes to vertically move the workbench 616.

The compliance mechanism 626 adopts a parallel leaf spring mechanism, which is deformed by an external force. After the external force is canceled, the mechanism returns the original position. The compliance mechanism 626 includes a lock and unlock mechanism that fixes the position in a state with no external force. Unlocking is performed for positioning between the workbench 616 and the assembly hand 612, and allows the workbench 616 to come into a movable state. In the other cases, locking is performed to fix the workbench 616 to improve efficiency of the assembly operation.

The positioning unit 605 preliminarily positions the assembly component 622, thereby improving the positional accuracy of the assembly component 622 gripped by the assembly hand 612. This improvement, in turn, improves the positional accuracy of assembling of the assembly component 622 into the assembly target component 623 by the assembly hand 612. In the positioning unit 605, a positioning stage 619 is provided on the Z-axis movement unit 615b. On the positioning stage 619, a positioning unit 620 is arranged. This unit 620 is engaged with the assembly component 622 to accurately define the phase of the assembly component 622 in the rotational direction and to position the assembly component 622 in the X and Y directions.

The supply unit 606 is for storing and supplying the assembly components 622. A supply unit 606 includes a supply pallet 621 that contains at least one assembly component 622 in a manner capable of supplying the component. The supply pallet 621 is mounted on the Z-axis movement unit 615c. The assembly hand 612, having moved to a position above the supply pallet 621 through the X-axis movement unit 611a and the Y-axis movement unit, grips the assembly component 622 on the supply pallet 621 by ascent by the Z-axis movement unit 615c. The supply unit 606 may contain multiple types of assembly components. Alternatively, multiple types of pallets may be arranged to supply multiple types of components.

The screw supplying unit 607 is for storing and supplying screws. A Z-axis movement unit 615d is provided at a distal end of the unit 607.

Figure 10:
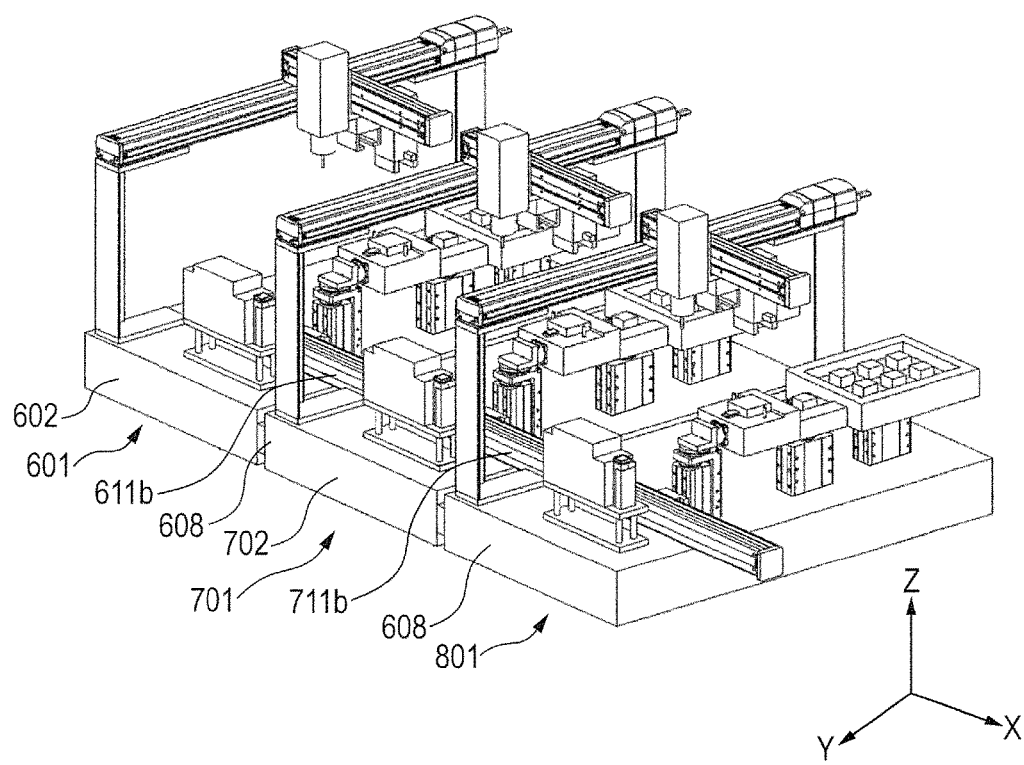
FIG. 10 is a schematic perspective view of an automated assembly line where the automated assembly apparatuses according to the sixth embodiment are provided adjacent to each other.

FIG. 10 is a perspective view schematically illustrating an automated production line that includes multiple automated assembly apparatuses of the present invention arranged adjacent to each other. The automated assembly apparatuses 601, 701 and 801, which are adjacent to each other, are arranged at relative positions adjusted within a predetermined ranges by spacers 108 sandwiched by the apparatuses.

In the automated production line, the X-axis movement unit 611b of the first automated assembly apparatus 601 is fixed onto the base 602 and arranged protruding toward the second assembly apparatus 701. The X-axis movement unit 711b of the second assembly apparatus 701 is fixed onto the base 702 and arranged protruding toward the third assembly apparatus 801.

<Description of Automated Assembly Method Using Automated Assembly Apparatuses>

Next, a series of operations of an automated assembly method according to the seventh embodiment of the present invention is specifically described. Here, as illustrated in FIG. 10, it is assumed that the number of robot cells that constitute the production line is three. The first automated assembly apparatus 610, the second automated assembly apparatus and the third automated assembly apparatus are illustrated from the upstream side in the direction in which the workpiece is conveyed.

Figure 11:
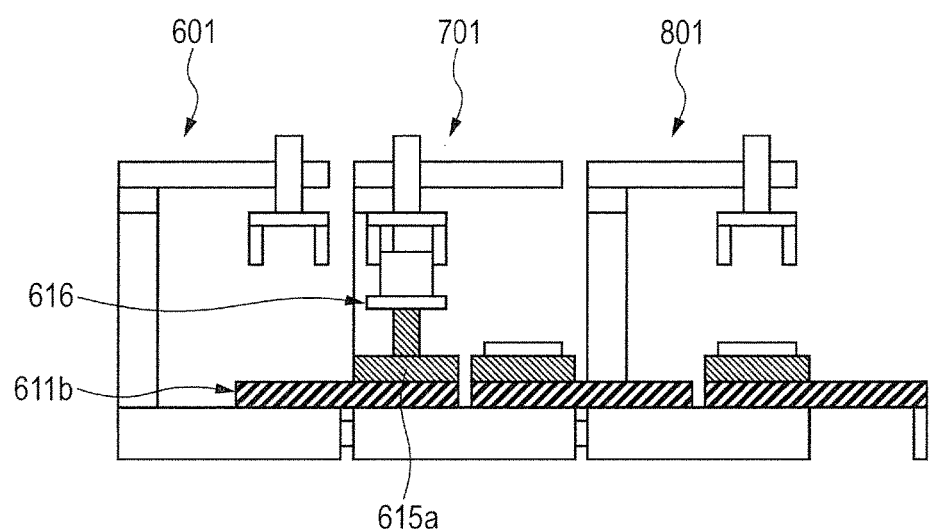
FIG. 11 is a schematic view of the automated assembly line that uses the automated assembly apparatuses according to the sixth embodiment.

FIG. 11 is a schematic view of an automated assembly line of the first embodiment. In the automated assembly apparatus 601 of the first embodiment, a slider (not illustrated) of the X-axis movement unit 611b, which is an electric slider, is provided with the Z-axis movement unit 615a, which is an electric slider including an internal rod capable of telescoping. The workbench 616 is fixed onto the Z-axis movement unit 615a by screws.

Referring to FIGS. 12A to 12F, operations of receiving and transferring an assembly target component 623 are described.

Figure 12:
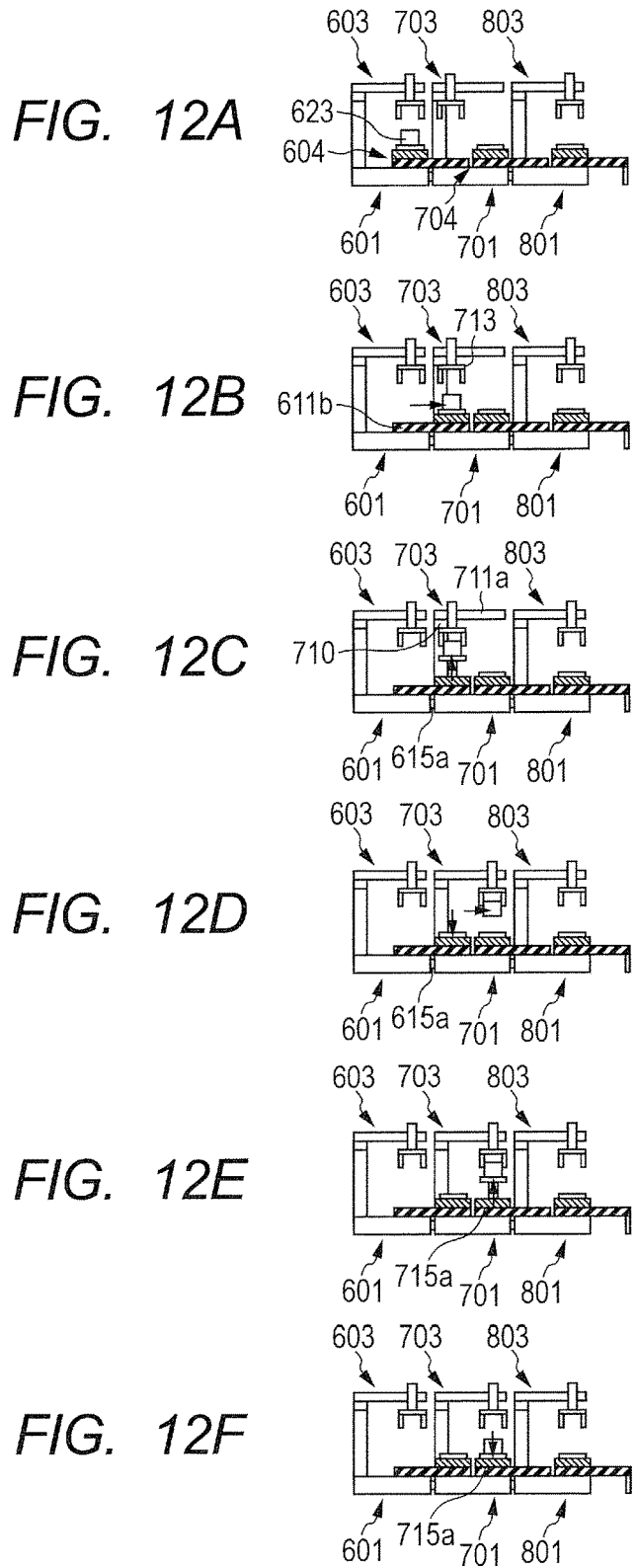
FIGS. 12A, 12B, 12C, 12D, 12E and 12F are schematic views illustrating an automated assembly method according to the sixth embodiment.

In FIG. 12A, the assembly target component 623, having been subjected to the assembly operation in the first assembly apparatus, is mounted on the workbench 616 of the workbench unit (holding unit) 604 of the first automated assembly apparatus 601.

In FIG. 12B, the X-axis movement unit 611b, which is an electric slider, of the first automated assembly apparatus is slid to cause the workbench 616 and the Z-axis movement unit 615a of the first assembly apparatus to enter the domain of the second automated assembly apparatus 701.

In FIG. 12C, after the entrance of the workbench 616 of the first automated assembly apparatus 601, the transfer hand 713 provided at the assembly robot 703 moves to a position above the workbench 616 of the first assembly apparatus through operations of the Y-axis movement unit 710 and the X-axis movement unit 711a.

After the transfer hand 713 has moved to the position above the workbench 616 of the first assembly apparatus, the Z-axis movement unit 615a of the first assembly apparatus moves to thereby raise the workbench 616, and the transfer hand 713 grips the assembly target component 623 mounted on the workbench 616. The transfer operation for the assembly target component 623 from the first automated assembly apparatus 601 to the second automated assembly apparatus 701 has thus been performed.

In FIG. 12D, after completion of the transfer of the assembly target component 623, the Z-axis movement unit 615a is lowered. After this unit is lowered, the transfer hand 713 provided at the assembly robot 703 moves to a position above the workbench unit 704 of the second assembly apparatus through operations of the Y-axis movement unit 710 and the X-axis movement unit 711a.

In FIG. 12E, after the transfer hand 713 has moved to the position above the workbench unit 704 of the second assembly apparatus, the Z-axis movement unit 715a provided at the workbench unit 704 of the second assembly apparatus is raised. The transfer hand 713 then releases the gripping, and mounts the assembly target component 723 on the workbench 716.

In FIG. 12F, after the Z-axis movement unit 715a is lowered, the assembly target component 723 is pressed against a stopper at a workpiece holding unit (not illustrated) including an air cylinder and this stopper, thereby positioning and holding the assembly target component 723.

Next, referring to FIG. 9, an operation of assembling the assembly component 622 into the assembly target component 623 is described.

The assembly hand 612 provided at the assembly robot 603 moves to a position above the supply unit 606 through operations of the Y-axis movement unit 610 and the X-axis movement unit 611a. After the assembly hand 612 has moved to the position above the supply unit 606, the Z-axis movement unit 615d provided at the supply unit 606 is raised. After this unit 606 has been raised, the assembly hand 612 grips the assembly component 622 arranged on the supply pallet 621. After the supply unit 606 is lowered through the operation of the Z-axis movement unit 615d, the assembly hand 612 moves to a position above the positioning unit 605 through operations of the Y-axis movement unit 610 and the X-axis movement unit 611a.

After the assembly hand 612 has moved to the position above the positioning unit 605, the Z-axis movement unit 615b provided at the positioning unit 605 is raised. After this unit 615b has been raised, the assembly hand 612 unchucks the assembly component 622 and mounts the assembly component 622 on the positioning stage 619. After unchucking by the assembly hand 612, the positioning unit 620 advances to thereby determining the accuracies of the assembly component 622 in position in X and Y directions and in phase direction. The positional accuracy of the assembly component 622 griped by the assembly hand 612 is improved. The operations are not necessarily performed in every case. The operations on the positioning unit 605 are performed only in the case where accurate assembly operations are required.

After the operation by the positioning unit 605 is completed, the Z-axis movement unit 615b is lowered. The assembly hand 612 moves to a position above the workbench unit 604 through operations of the Y-axis movement unit 610 and the X-axis movement unit 611a. After the assembly hand 612 has moved to the position above the workbench unit 604, the compliance mechanism 626 is unlocked to allow the workbench 616 to move. After the workbench 616 is allowed to move, the Z-axis movement unit 615a provided at the workbench unit 604 raises the workbench 616.

The workbench 616 is raised and the workbench 616 conforms by the compliance mechanism 626, and the pin-shaped guide unit 625 provided at the workbench 616 is fitted into the through-hole 624 provided at the assembly hand 613, thereby positioning the workbench 616 and the assembly hand 613 with respect to each other. In the state where the workbench 616 and the assembly hand 613 are positioned, the workbench 616 is further raised to cause the assembly component 622 gripped by the assembly hand 612 to be fitted into the assembly target component 623, which is positioned and held by the workbench 616. After the fitting, the assembly hand 612 releases the gripping of the assembly component 622, and the workbench 615 is lowered by the Z-axis movement unit 615a.

After the assembly component 622 is fitted into the assembly target component 623, the screw fastening unit 614 moves to a position above the screw supplying unit 607 through operations of the Y-axis movement unit 610 and the X-axis movement unit 611a. The Z-axis movement unit 615d of the screw supplying unit 607 is raised to thereby allow the screw fastening unit 614 to suck a screw (not illustrated) by air or magnetic force and acquire the screw. After the screw is acquired, the screw fastening unit 614 moves to a position above the workbench unit 604 through operations of the Y-axis movement unit 610 and the X-axis movement unit 611a. Subsequently, the Z-axis movement unit 615a is raised to allow screw fastening to be performed. The screw fastening unit 614 and the screw supplying unit 607 are required only in the case where a screw fastening step is to be performed. This step is not necessarily performed in every case. The component can be attached and detached as necessary.

When the swing unit 618 is used, an operation of assembling the assembly component 622 into the assembly target component 623 in multiple directions, and a fixing operation, such as screw fastening, can be performed.

In the assembly operation, the assembly target component is conveyed from the first assembly apparatus to the second assembly apparatus. However, this example is not limit the conveyance direction. If the conveyance direction is inverted, the assembly target component having subjected to assembly in the second assembly apparatus is conveyed from the second assembly apparatus to the first assembly apparatus by the Z-axis movement unit of the first assembly apparatus.

In the automated assembly apparatus 601 of the first embodiment of the present invention, the workbench 616 that holds the assembly target component 623 includes the Z-axis movement unit 615b that moves in the Z-axis direction, and the workbench 616 vertically moves to perform assembly operations. Consequently, the assembly robot 603 of the automated assembly apparatus 601 of the first embodiment has a lighter weight than an assembly robot that includes X-axis, Y-axis and Z-axis drive units. Accordingly, the inertial force affected during movement becomes small. Consequently, if the X-axis movement unit 611a and the Y-axis movement unit 610 move at high speeds, the positional accuracy of the assembly target component 623 on the workbench 616 is improved. Accordingly, accurate assembly can be achieved.

The automated assembly apparatus 601 of the first embodiment of the present invention is not necessarily provided with a conveyor for conveying the assembly target component 623. Consequently, the size and cost of the apparatus can be reduced. In the automated assembly apparatus 601, the X-axis movement unit 611b is provided with the Z-axis movement unit 615a. Consequently, the component 623 into which the assembly component 622 has been assembled can be conveyed. Targets to be conveyed by the Z-axis movement unit 615a are the workbench 616 and the assembly target component 623. The Z-axis movement unit 615a, which has a low allowable load, may be adopted to reduce the weight of the apparatus.

Seventh Embodiment

Figure 13:
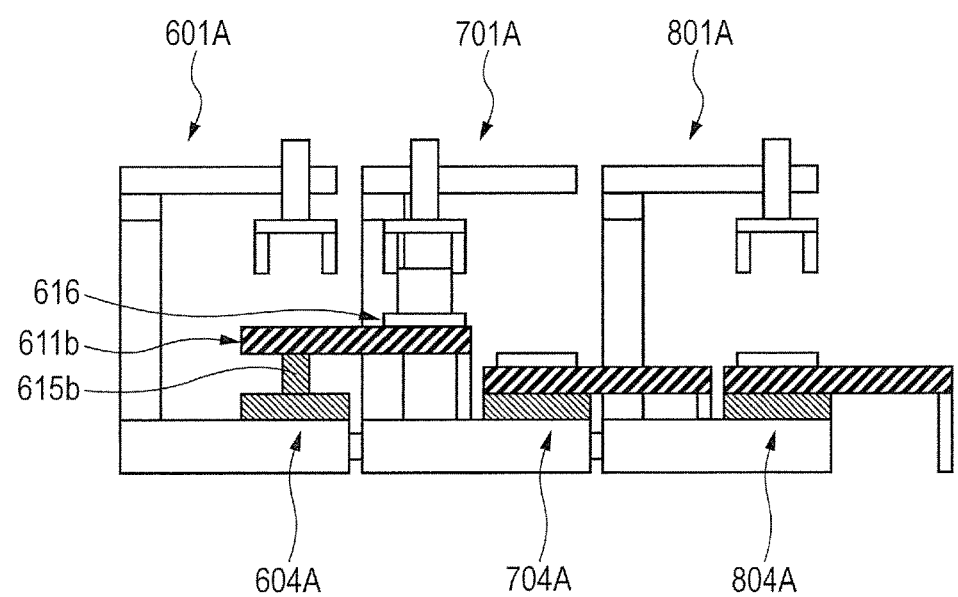
FIG. 13 is a schematic view of an automated assembly line that uses automated assembly apparatuses according to a seventh embodiment.

Hereinafter, a seventh embodiment of the present invention is specifically described with reference to FIG. 13. As illustrated in FIG. 13, as with the sixth embodiment, the automated assembly apparatus of the seventh embodiment constitutes an automated assembly system that includes three automated assembly apparatuses 601A, 701A and 801A which are arranged and used. The automated assembly apparatuses 601A, 701A and 801A of the seventh embodiment are adopted that have configurations similar to those of the sixth embodiment, except in that the configurations of the workbench units 604, 704 and 804 are different from those in the sixth embodiment.

As illustrated in FIG. 13, in the workbench units 604A, 704A and 804A of the automated assembly apparatuses of the seventh embodiment, Z-axis movement units 615b, 715b and 815b that are electric sliders including internal rods capable of telescoping are provided with respective X-axis movement units 611b, 711b and 811b that are electric sliders.

Referring to FIGS. 14A to 14F, operations of receiving and transferring an assembly target component 623 are described.

Figure 14A:
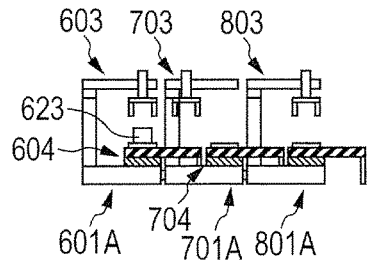
FIGS. 14A, 14B, 14C, 14D, 14E and 14F are schematic views illustrating an automated assembly method according to the seventh embodiment.
Figure 14B:
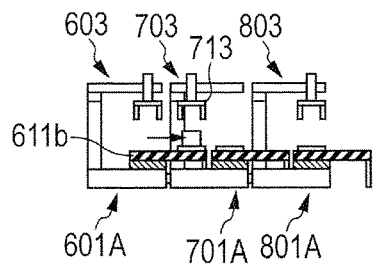

The step of the workbench 616 of the first automated assembly apparatus 601A entering the inside of the second automated assembly apparatus 701A in FIGS. 14A and 14B is similar to the step in the sixth embodiment.

Figure 14C:
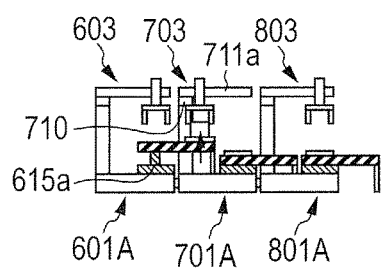

In FIG. 14C, after the entrance of the workbench 616 of the first automated assembly apparatus 601A, the transfer hand 713 provided at the assembly robot 703 moves to a position above the workbench 616 of the first assembly apparatus through operations of the Y-axis movement unit 710 and the X-axis movement unit 711a. After the transfer hand 713 has moved to the position above the workbench 616 of the first assembly apparatus, the Z-axis movement unit 615a of the first assembly apparatus moves to thereby raise the workbench 616 and the X-axis movement unit 611b, and the transfer hand 713 grips the assembly target component 723 mounted on the workbench 616. The transfer operation for the assembly target component 623 from the first automated assembly apparatus 601A to the second automated assembly apparatus 701A has thus been performed.

Figure 14D:
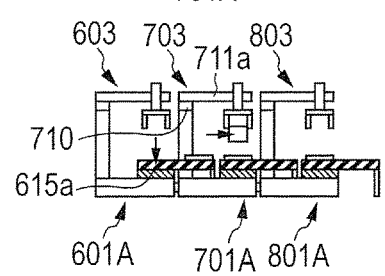

In FIG. 14D, after completion of the transfer of the assembly target component 623, the Z-axis movement unit 615a is lowered. After this unit is lowered, the transfer hand 713 provided at the assembly robot 703 moves to a position above the workbench unit 704 of the second assembly apparatus through operations of the Y-axis movement unit 710 and the X-axis movement unit 711a.

Figure 14E:
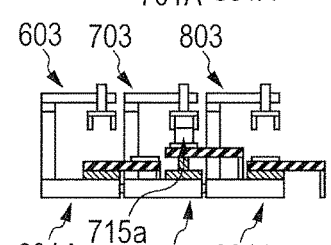

In FIG. 14E, after the transfer hand 713 has moved to the position above the workbench unit 704 of the second assembly apparatus, the Z-axis movement unit 715a provided at the workbench unit 704 of the second assembly apparatus is raised. The transfer hand 713 then performs unchucking to thereby mount the assembly target component 623 on the workbench 716.

Figure 14F:
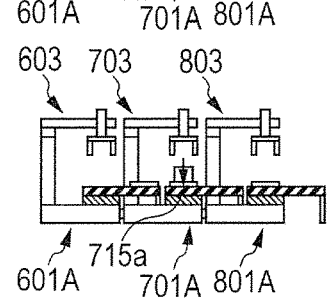

In FIG. 14F, after the Z-axis movement unit 715a is lowered, the workpiece holding unit 717, not illustrated, advances to thereby position and hold the assembly target component 623.

In the automated assembly apparatus 601A of the seventh embodiment of the present invention, the Z-axis movement unit 615a is provided with the X-axis movement unit 611b. The automated assembly apparatus 601A of the seventh embodiment reduces the weight of the target to be conveyed by the X-axis movement unit 611b, thereby improving the accuracy of stopping the X-axis movement unit. Furthermore, the vibrations of the X-axis movement unit 611b in the case of being driven can be reduced, which can achieve accurate assembly.

Eighth Embodiment

Figure 15:
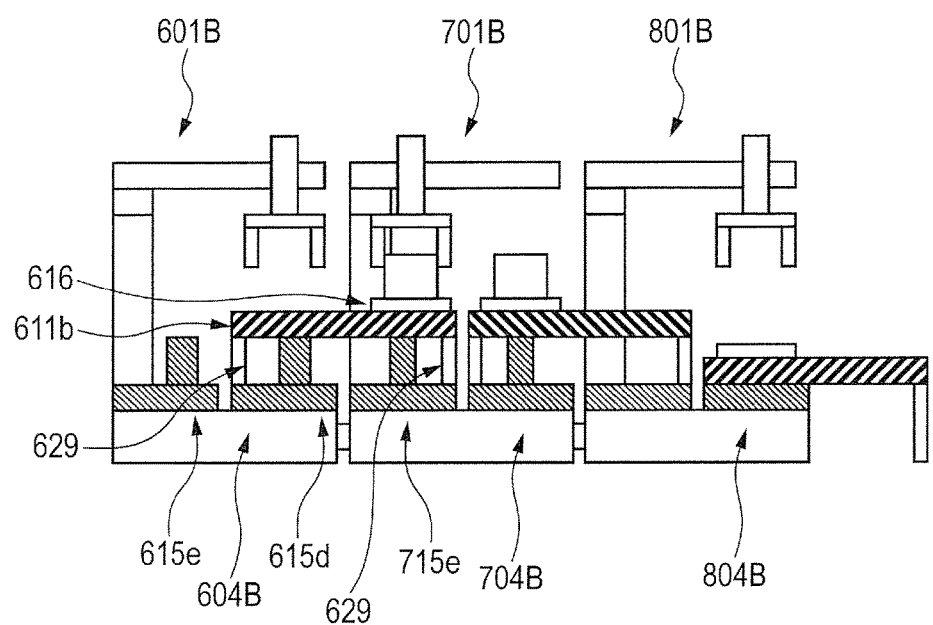
FIG. 15 is a schematic view of an automated assembly line that uses an automated assembly apparatus according to an eighth embodiment.

Hereinafter, an eighth embodiment of the present invention is specifically described with reference to FIG. 15. As illustrated in FIG. 15, as with the sixth embodiment, the automated assembly apparatuses of the eighth embodiment constitute an automated assembly system that includes three automated assembly apparatuses 601B, 701B and 801B which are arranged and used. The automated assembly apparatuses 601B, 701B and 801B of the eighth embodiment are adopted that have configurations similar to those of the sixth embodiment, except in that the configurations of the workbench units 604, 704 and 804 are different from those in sixth embodiment.

As illustrated in FIG. 15, the Z-axis movement unit 615d fixed onto the base, and the Z-axis movement unit 615e are provided. X-axis movement unit 611b and the workbench 616 are provided on the Z-axis movement unit 615d. The X-axis movement unit 611b vertically moves while being kept parallel to the base by a linear guide 629. The X-axis movement unit 611b moves in the Z direction by vertical movement of the Z-axis movement unit 615d, and moves in the Z direction by movement of the Z-axis movement unit 615e of the second automated assembly apparatus 601B provided adjacent thereto. Referring to FIGS. 16A to 16F, operations of receiving and transferring an assembly target component 623 are described.

Figure 16A:
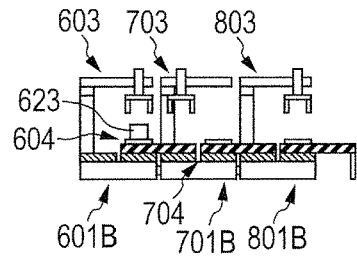
FIGS. 16A, 16B, 16C, 16D, 16E and 16F are schematic views illustrating an automated assembly method according to the eighth embodiment.
Figure 16B:
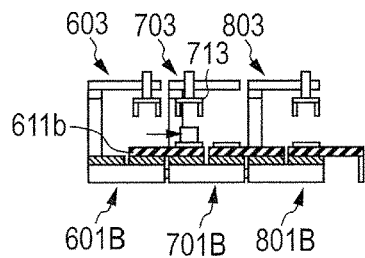

The step of the workbench 616 of the first automated assembly apparatus 601A entering the inside of the second automated assembly apparatus 701B in FIGS. 16A and 16B is similar to the step in the first embodiment.

Figure 16C:
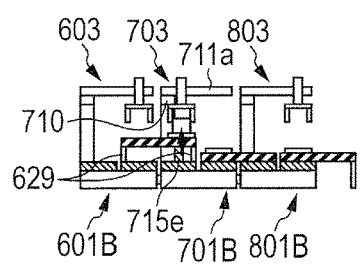

In FIG. 16C, after the entrance of the workbench 616 of the first automated assembly apparatus 601B, the transfer hand 713 provided at the assembly robot 703 moves to a position above the workbench 616 of the first assembly apparatus through operations of the Y-axis movement unit 710 and the X-axis movement unit 711a. After the transfer hand 713 has moved to the position above the workbench 616 of the first assembly apparatus, the Z-axis movement unit 715a of the second automated assembly apparatus 701 moves to thereby raise the workbench 616 and the X-axis movement unit 611b, and the transfer hand 713 grips the assembly target component 623 mounted on the workbench 616. Here, the Z-axis movement unit 615d does not operate. The transfer operation for the assembly target component 623 from the first automated assembly apparatus 601B to the second automated assembly apparatus 701B has thus been performed.

Figure 16D:
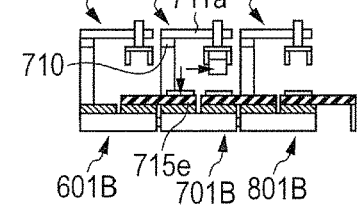

In FIG. 16D, after completion of the transfer of the assembly target component 623, the Z-axis movement unit 715e is lowered. After this unit is lowered, the transfer hand 713 provided at the assembly robot 703 moves to a position above the workbench unit 704 of the second assembly apparatus through operations of the Y-axis movement unit 710 and the X-axis movement unit 711a.

Figure 16E:
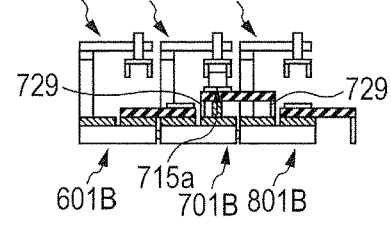

In FIG. 16E, after the transfer hand 713 has moved to the position above the workbench unit 704 of the second automated assembly apparatus, the Z-axis movement unit 715a provided at the workbench unit 704 of the second assembly apparatus moves to thereby raise the workbench 716 and the X-axis movement unit 711b. The transfer hand 713 then performs unchucking to thereby mount the assembly target component 623 on the workbench 716.

Figure 16F:
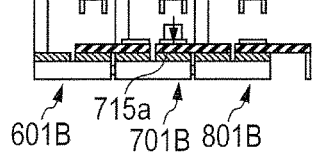

In FIG. 16F, after the Z-axis movement unit 715d is lowered, the workpiece holding unit 717, not illustrated, advances to thereby position and hold the assembly target component 623. Here, the Z-axis movement unit 715d does not operate.

In an automated assembly line that uses the automated assembly apparatus 601B of the eighth embodiment, the X-axis movement unit 611b of the first automated assembly apparatus can be moved in the Z direction not only by the Z-axis movement unit 615d but also by the Z-axis movement unit 715e of the second automated assembly apparatus provided adjacent thereto. In the automated assembly line that uses the automated assembly apparatus 601B of the eighth embodiment, the Z axis is defined at a position adjacent to the barycenter of the assembly target component 623, thereby allowing reduction in load on the X-axis movement unit. Consequently, the automated assembly apparatus 601B of the eight embodiment can reduce the weight of the apparatus through use of the X-axis movement unit 611b having a low allowable load.

Ninth Embodiment

Figure 17:
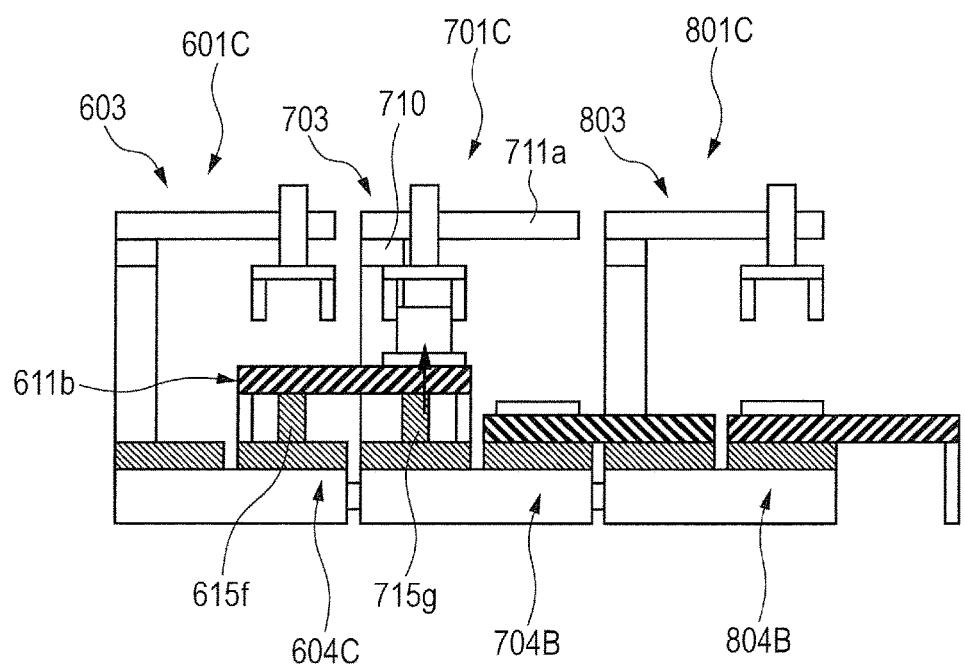
FIG. 17 is a schematic view of an automated assembly line that uses automated assembly apparatuses according to a ninth embodiment.

Hereinafter, a ninth embodiment of the present invention is specifically described with reference to FIG. 17. As illustrated in FIG. 17, as with the sixth embodiment, the automated assembly apparatuses of the ninth embodiment constitute an automated assembly system that includes three automated assembly apparatuses 601C, 701C and 801C which are arranged and used. The automated assembly apparatuses 601C, 701C and 801C of the ninth embodiment are adopted that have configurations similar to those of the sixth embodiment, except in that the configurations of the workbench units 604, 704 and 804 are different from those in the sixth embodiment. As illustrated in FIG. 17, the workbench units 604C, 704C and 804C of the automated assembly apparatuses of the ninth embodiment are provided with two Z-axis movement units fixed onto the base. The X-axis movement unit 611b is attached to the Z-axis movement unit 615g of the first automated assembly apparatus and to the Z-axis movement unit 715f of the second automated assembly apparatus provided adjacent to the first automated assembly apparatus. The X-axis movement unit 611b is moved in the Z-axis direction by synchronized vertical movement of the Z-axis movement unit 615g and the Z-axis movement unit 715f.

In an automated assembly line that uses the automated assembly apparatus 601C of the ninth embodiment of the present invention, the X-axis movement unit 611b of the first automated assembly apparatus is fixed not only to the Z-axis movement unit 615f but also to the Z-axis movement unit 715g of the second automated assembly apparatus 701C provided adjacent thereto. Consequently, the automated assembly apparatus of the ninth embodiment can move in the Z direction. In the automated assembly line that uses the automated assembly apparatus 601C of the ninth embodiment, the Z axis is defined at a position adjacent to the barycenter of the assembly target component 623, thereby allowing reduction in load on the X-axis movement unit. Consequently, the automated assembly apparatus 601C of the ninth embodiment can assemble the assembly target component 623 having a heavy weight.

In the sixth to ninth embodiments, for positioning the first automated assembly apparatus and the second automated assembly apparatus or positioning the second automated assembly apparatus and the third automated assembly apparatus, positional adjustment may be performed using the positioning method having been described in the third to fifth embodiments.

The present invention can achieve the following advantageous effects. The holding unit that holds the assembly target component includes the Z-axis movement unit that moves in the Z-axis direction, and the holding unit vertically moves to thereby perform assembly operations. Consequently, the moment of inertia during movement is smaller than the moment of inertia of a typical assembly robot that includes a Z-axis linear joint. Accordingly, even if the X-axis movement unit and the Y-axis movement unit move at high speeds, the vibrations of the grip unit that grips the assembly component can be reduced to be small. Consequently, the positional accuracy of the grip unit stopping above the holding unit is improved, which can achieve accurate assembly.

With respect to the assembly target component that is held by the holding unit, the assembly component gripped by the grip unit provided at the assembly robot has a light weight. Accordingly, the movement weight moved by the assembly robot is reduced, thereby allowing the moment of inertia to be small. Consequently, even if the grip unit is moved at a high speed, the vibrations of the grip unit can be reduced small. Accordingly, the positional accuracy of the grip unit stopping above the holding unit is improved, thereby allowing accurate assembly.

Furthermore, the holding unit that holds the assembly target component is thus provided with the Z-axis movement unit. Accordingly, the moment of inertia, which affects the assembly robot, is reduced to be small. Consequently, even if the X-axis movement unit and the Y-axis movement unit move at high speeds, the vibrations of the grip unit can be reduced to be small. Accurate automated assembly apparatus can therefore be achieved.

With respect to the assembly target component that is held by the holding unit, the assembly component gripped by the grip unit provided at the assembly robot has a light weight. Accordingly, the movement weight moved by the assembly robot is reduced, thereby allowing the moment of inertia to be small. Consequently, even if the grip unit is moved at a high speed, the vibrations of the grip unit can be reduced small. Accordingly, the positional accuracy of the grip unit stopping above the holding unit is improved, thereby allowing accurate assembly.

Furthermore, the holding unit that holds the assembly target component is thus provided with the Z-axis movement unit. Accordingly, the moment of inertia, which affects the assembly robot, is reduced to be small. Consequently, even if the X-axis movement unit and the Y-axis movement unit move at high speeds, the vibrations of the grip unit can be reduced to be small. Accurate automated assembly apparatus can therefore be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-199886, filed Sep. 30, 2014, Japanese Patent Application No. 2015-091163, filed Apr. 28, 2015 and Japanese Patent Application No. 2015-166054, filed Aug. 25, 2015, which are hereby incorporated by reference herein in their entirety.

What is claimed is:

1. An automated assembly apparatus comprising:
  an assembly robot that includes a Y-axis movement unit, a first X-axis movement unit movable in a Y-axis direction along the Y-axis movement unit, and a grip unit movable in an X-axis direction along the X-axis movement unit; and
  a workbench unit including a Z-axis movement unit arranged below the assembly robot with respect to a Z-axis and a workbench movable in the Z-axis direction along the Z-axis movement unit,
  wherein the assembly robot and the workbench unit are configured to perform an assembly operation for a first assembly component gripped by the grip unit and a second assembly component mounted on the workbench unit through movement in the Z-axis direction by the workbench unit, and
  wherein the assembly robot has no unit for moving the grip unit in the Z-axis direction.

2. The automated assembly apparatus according to claim 1, wherein at least one of the grip unit and the workbench unit are provided with at least one of a positioning pin and a positioning hole of a positioning mechanism for adjusting positions of the first assembly component gripped by the grip unit and the second assembly component mounted on the workbench unit, and wherein the workbench unit includes a compliance mechanism that moves in the X-axis direction and the Y-axis direction.

3. The automated assembly apparatus according to claim 1, wherein the workbench unit includes a second X-axis movement unit and the Z-axis movement unit is movable in the X-axis direction along the second X-axis movement unit.

4. The automated assembly apparatus according to claim 3, wherein the second X-axis movement unit includes a guide rail, and a mobile body that moves in the X-axis direction along the guide rail, and wherein the mobile body moves with respect to the guide rail to move the workbench to an outside of the automated assembly apparatus in a plan view.

5. An automated assembly method of causing an automated assembly apparatus to assemble a first component and a second component, wherein the automated assembly apparatus includes:

an assembly robot that includes a Y-axis movement unit, a first X-axis movement unit movable in a Y-axis direction along the Y-axis movement unit, and a grip unit movable in an X-axis direction along the X-axis movement unit; and a workbench unit that is arranged below the assembly robot with respect to an Z-axis, and includes a second X-axis movement unit, a Z-axis movement unit movable in the X-axis direction along the second X-axis movement unit, and a workbench movable in the Z-axis direction by the Z-axis movement unit, the automated assembly method comprising:

performing an assembly operation for a first assembly component gripped by the grip unit and a second assembly component mounted on the workbench unit through movement in the Z-axis direction by the workbench unit without movement of the grip unit in the Z-axis direction.

6. The automated assembly method according to claim 5, wherein the assembly robot has no unit for moving the grip unit in the Z-axis direction.

* * * * *